United States Patent [19]

Seo et al.

[11] Patent Number: 5,780,831
[45] Date of Patent: Jul. 14, 1998

[54] ONE-DIMENSIONAL AND TWO-DIMENSIONAL DATA SYMBOL READER

[75] Inventors: Shuzo Seo; Nobuhiro Tani; Takeharu Shin; Makoto Nukui; Yukihiro Ishizuka, all of Tokyo, Japan

[73] Assignee: Asahi Kogaku Kogyo Kabushiki Kaisha, Tokyo, Japan

[21] Appl. No.: 674,835

[22] Filed: Jul. 3, 1996

[30] Foreign Application Priority Data

Jul. 12, 1995 [JP] Japan ................................ 7-199054
Jul. 14, 1995 [JP] Japan ................................ 7-201564

[51] Int. Cl.⁶ ............................................. G06K 7/10
[52] U.S. Cl. ................................ 235/462; 235/472
[58] Field of Search ............................ 235/462, 472, 235/454, 463, 464, 494

[56] References Cited

U.S. PATENT DOCUMENTS 5,347,121 9/1994 Rudeen et al. ...................... 235/472
5,428,212 6/1995 Tani et al. ........................... 235/472

FOREIGN PATENT DOCUMENTS 2264383 10/1990 Japan ................................. 239/472

Primary Examiner—Donald T. Hajec
Assistant Examiner—Le Thien Minh
Attorney, Agent, or Firm—Greenblum & Bernstein, P.L.C.

[57] ABSTRACT

A data symbol reader for reading a one-dimensional data symbol and a two-dimensional data symbol includes first and second image pickup devices, both having a light receiving surface to receive light reflected from the one-dimensional and two-dimensional data symbols. An optical system respectively converges images of the one-dimensional and two-dimensional data symbols onto the light receiving surfaces of the first and second image pickup devices. A signal processing device is provided for decoding the one-dimensional and the two-dimensional data symbols from outputs of the first and second image pickup devices.

14 Claims, 17 Drawing Sheets a, b : Margin Section c : Decoding Area a, b : Margin Section c : Decoding Area

ONE-DIMENSIONAL AND TWO-DIMENSIONAL DATA SYMBOL READER

BACKGROUND OF THE INVENTION

1. Field of the Invention

The present invention relates to a data symbol reader which reads coded data symbols.

2. Description of the Related Art

Recently, in a POS (point of sale) system or the like, methods and apparatuses for reading a bar code which represents sales information of merchandise have commonly been used. However, in such known conventional bar code readers, the bar code is only scanned in one direction (one-dimensional), i.e., in the direction of the alignment of the bars which form the bar code. Consequently, the amount of data that can be provided and read is limited.

To increase the amount of data to be read, a data symbol reader which reads a two-dimensional data symbol, consisting of a mosaic pattern of black and white areas having a matrix arrangement, has recently been proposed.

Accordingly, there are primarily two types of data symbol readers, i.e., the conventional bar code reader which reads a one-dimensional data symbol, and the data symbol reader which reads a two-dimensional data symbol.

Since, the one-dimensional bar code and the two-dimensional data symbol are usually provided concurrently, it is preferable to provide a data symbol reader which can respectively read (decode) the bar code and the two-dimensional data symbol using a single apparatus.

SUMMARY OF THE INVENTION

The primary object of the present invention is to provide a data symbol reader having a simple structure, using an imaging device having a small number of pixels, which is capable of reading both a one-dimensional data symbol, a bar code for example, and a two-dimensional data symbol.

Another object of the present invention is to provide a data symbol reader which can be easily positioned to read different types of data symbols.

To achieve the objects of the present invention, in an aspect of the present invention, a data symbol reader for reading a one-dimensional data symbol and a two-dimensional data symbol is provided, having first and second image pickup devices, both having a light receiving surface to receive light reflected from the one-dimensional and the two-dimensional data symbol, respectively, an optical system to respectively converge images of the one-dimensional and two-dimensional data symbols onto the light receiving surfaces of the first and second image pickup devices, and signal processing means for decoding the one-dimensional and the two-dimensional data symbols from outputs of the first and second image pickup devices.

Preferably, the optical system has an optical member to split an optical path into an optical path directed towards the first image pickup device and an optical path directed towards the second image pickup device.

The optical system is preferably provided with a first converging optical system and a second converging optical system. The first converging optical system converges the image of the one-dimensional or two-dimensional data symbol onto the light receiving surface of the first image pickup device, and sets a magnification of the image converged onto the first image pickup device. The second converging optical system converges the image of the one-dimensional or two-dimensional data symbol onto the light receiving surface of the second image pickup device, and sets a magnification of the image converged onto the second image pickup device. A part of an optical path of the first converging optical system is commonly used as a part of an optical path of the second converging optical system.

The first image pickup device preferably consists of a line sensor, and the second image pickup device preferably consists of an area sensor.

It is preferred that mode setting means are provided to select one of a first mode, to read the one-dimensional data symbol, and a second mode, to read the two-dimensional data symbol.

Preferably, discriminating means are provided to discriminate whether an imaged data symbol is the one-dimensional or the two-dimensional data symbol, and switching means are provided to switch a decoding operation which is made by the signal processing means in accordance with a discrimination made by the discriminating means.

In another aspect of the present invention, a data symbol reader is provided, having a casing having an opening at a head thereof, an image pickup device having a light receiving surface, an optical system which converges an image of a data symbol onto the image pickup device, the data symbol being introduced through the opening of the casing, and, an opening shape varying mechanism to vary a shape of the opening of the casing.

In yet another aspect of the present invention, a data symbol reader is provided for reading a one-dimensional data symbol and a two-dimensional data symbol, having a casing having an opening at a head thereof, an image pickup device having a light receiving surface, an optical system which converges an image of the one-dimensional data symbol and the two-dimensional data symbol onto the image pickup device, the data symbols being introduced through the opening of the casing, and an opening shape varying mechanism to vary a shape of the opening in accordance with a shape of the one-dimensional and two-dimensional data symbols.

Preferably, the image pickup device consists of a first image pickup device to read the one-dimensional data symbol, and a second image pickup device to read the two-dimensional data symbol. The optical system converges the image of the one-dimensional or two-dimensional data symbol onto light receiving surfaces of the first and second image pickup devices.

Preferably, the opening shape varying mechanism consists of a pair of opening members to form the opening, and means for changing the position of the pair of opening members between a primary position, to read the one-dimensional data symbol, and a secondary position, to read the two-dimensional data symbol.

Each opening member preferably has a U-shaped cross section, with free ends of each U-shaped opening member being pivoted to the casing, respectively so that an opening shape formed by the pair of opening members varies due to a relative rotation thereof.

Preferably, motion transmitting means are provided to transmit a motion of one of the pair of opening members to another of the pair of opening members, so that the pair of opening members move each other in a synchronous manner.

The motion transmitting means preferably consists of a pair of gears each provided on each of the pair of opening members coaxial to the pivot thereof. The pair of gears being engaged with each other so that the pair of opening members rotate in opposite directions to open and close the opening formed by the opening members.

Preferably, position maintaining means are provided to maintain the primary and secondary positions of each of the pair of opening members.

Preferably, a length of an optical path from the first image pickup device to the opening in the primary position, and a length of an optical path from the second image pickup device to the opening in the secondary position, are approximately equal to each other.

Preferably, mode setting means are provided to select one of a first mode, to read the one-dimensional data symbol, and a second mode, to read the two-dimensional data symbol.

Preferably, a sensor for detecting positions of the pair of opening members, and mode setting means to select one of a first mode, to read the one-dimensional data symbol, and a second mode, to read the two-dimensional data symbol, in accordance with a detected signal output from the sensor, are provided. One of the one-dimensional and two-dimensional data symbols is read according to a mode set by the mode setting means.

The present disclosure relates to subject matter contained in Japanese Patent Application No.7-199054 (filed on Jul. 12, 1995) and Japanese Patent Application No.7-201564 (filed on Jul. 14, 1995) which are expressly incorporated herein by reference in their entirety.

BRIEF DESCRIPTION OF THE DRAWINGS

The above other objects, features, and advantages of the preset invention will be described in greater detail with reference to the accompanying drawings, in which like reference numerals indicate like elements, and wherein.

DESCRIPTION OF THE PREFERRED EMBODIMENTS

Several embodiments of the present invention will now be described below with reference to the accompanying drawings.

Figure 1:
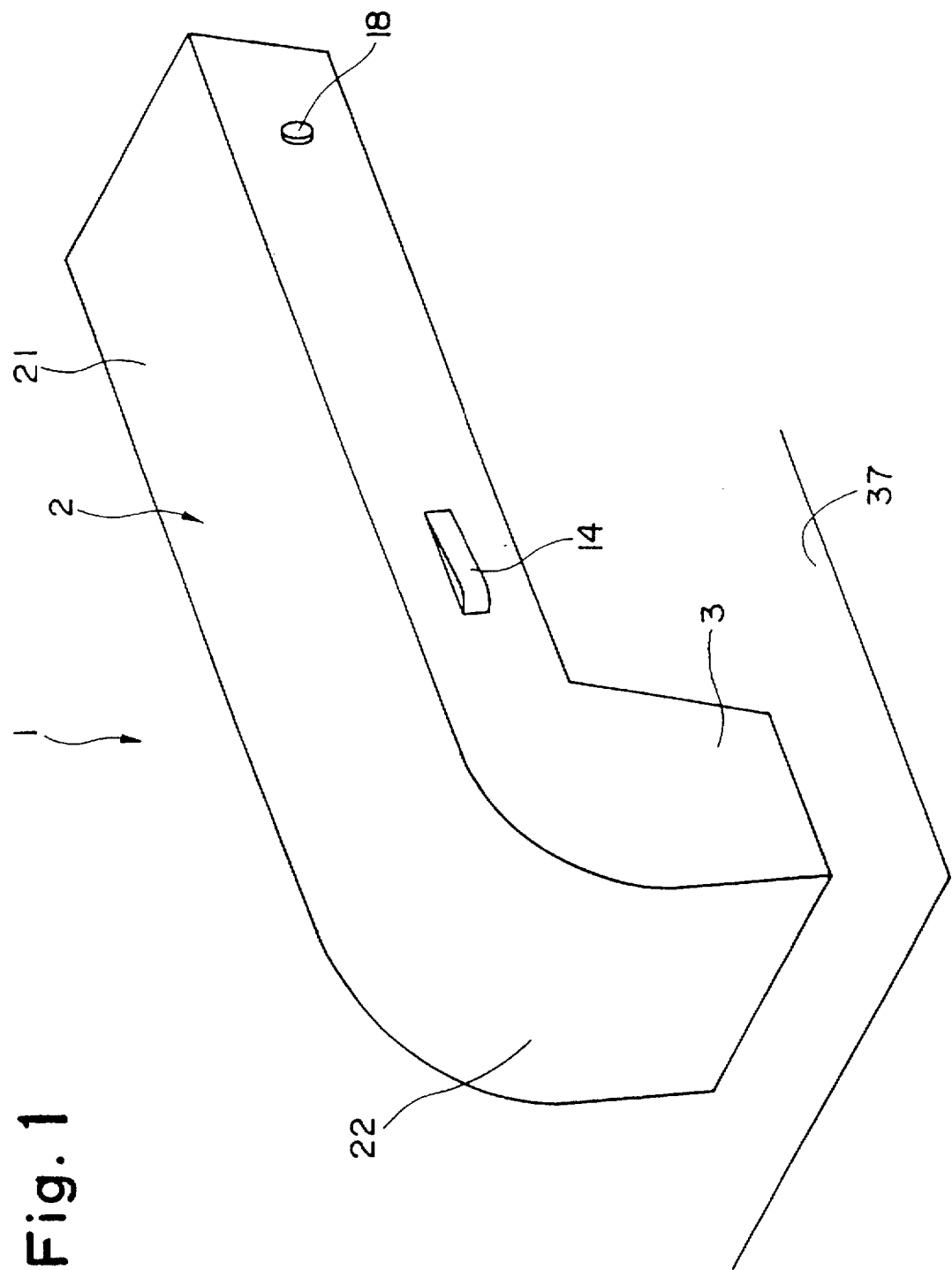
FIG. 1 is a perspective view of a data symbol reader according to a first embodiment of the present invention.
Figure 2:
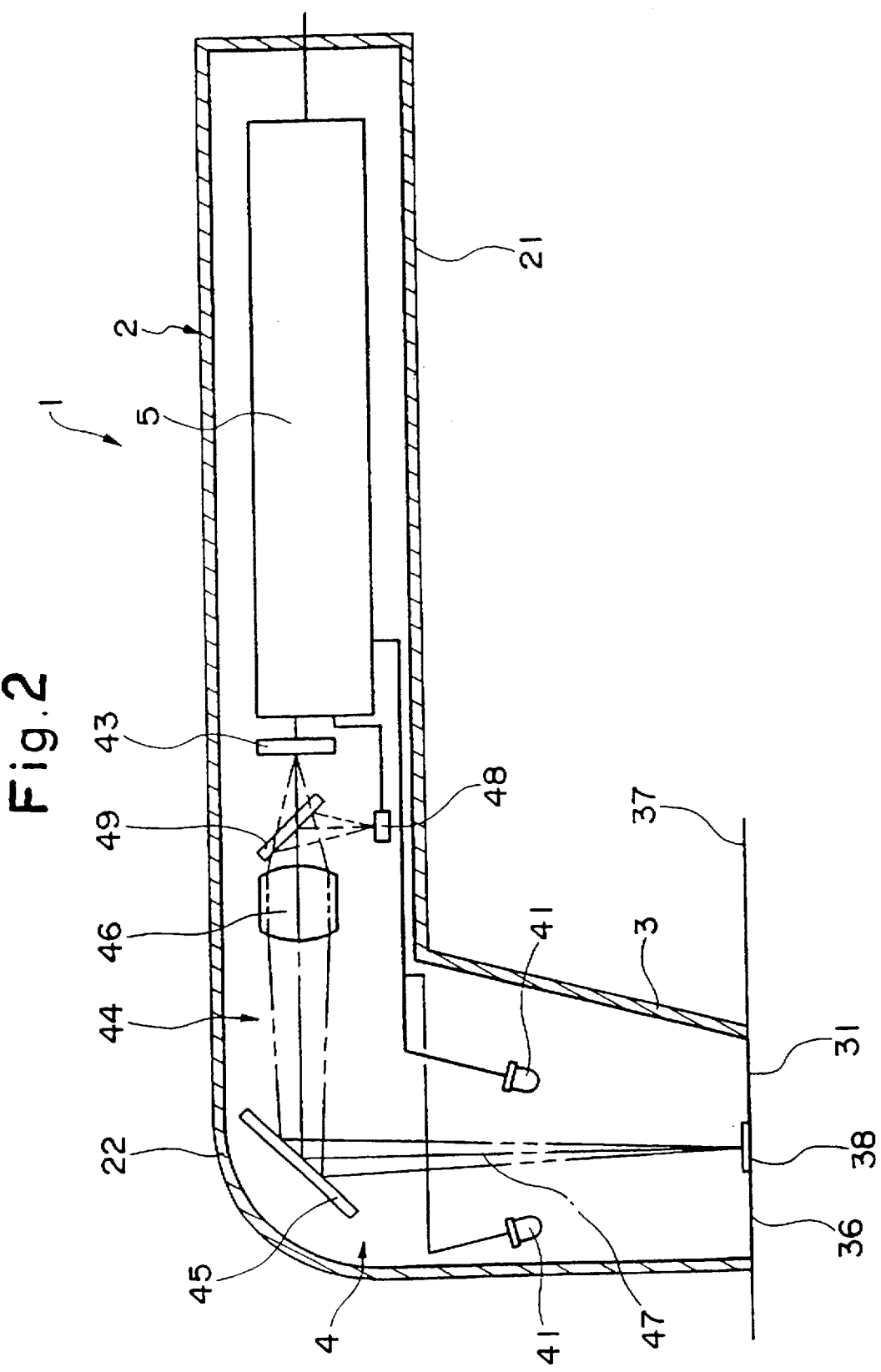
FIG. 2 is a longitudinal sectional view of the data symbol reader shown in FIG. 1.

FIGS. 1 and 2 show a data symbol reader 1, according to a first embodiment of the present invention. The data symbol reader 1 is provided with a casing 2 having a shape approximately that of the letter L. The casing 2 consists of a rectangular holding portion 21, to be held by an operator, and a head 22, which extends approximately perpendicular from an end of the holding portion 21.

Figure 3:
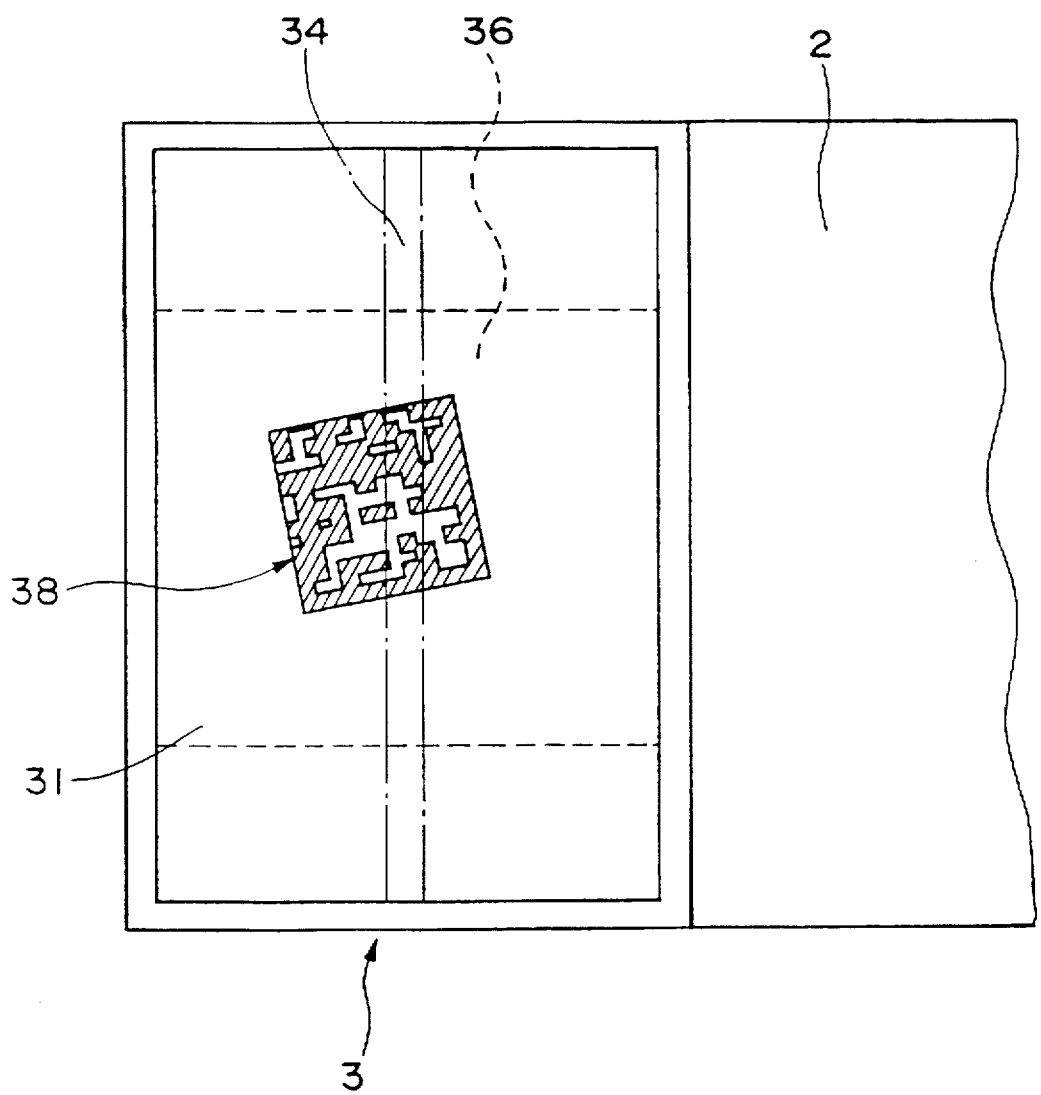
FIG. 3 is a bottom plan view of a housing of the data symbol reader shown in FIG. 1.
Figure 5:
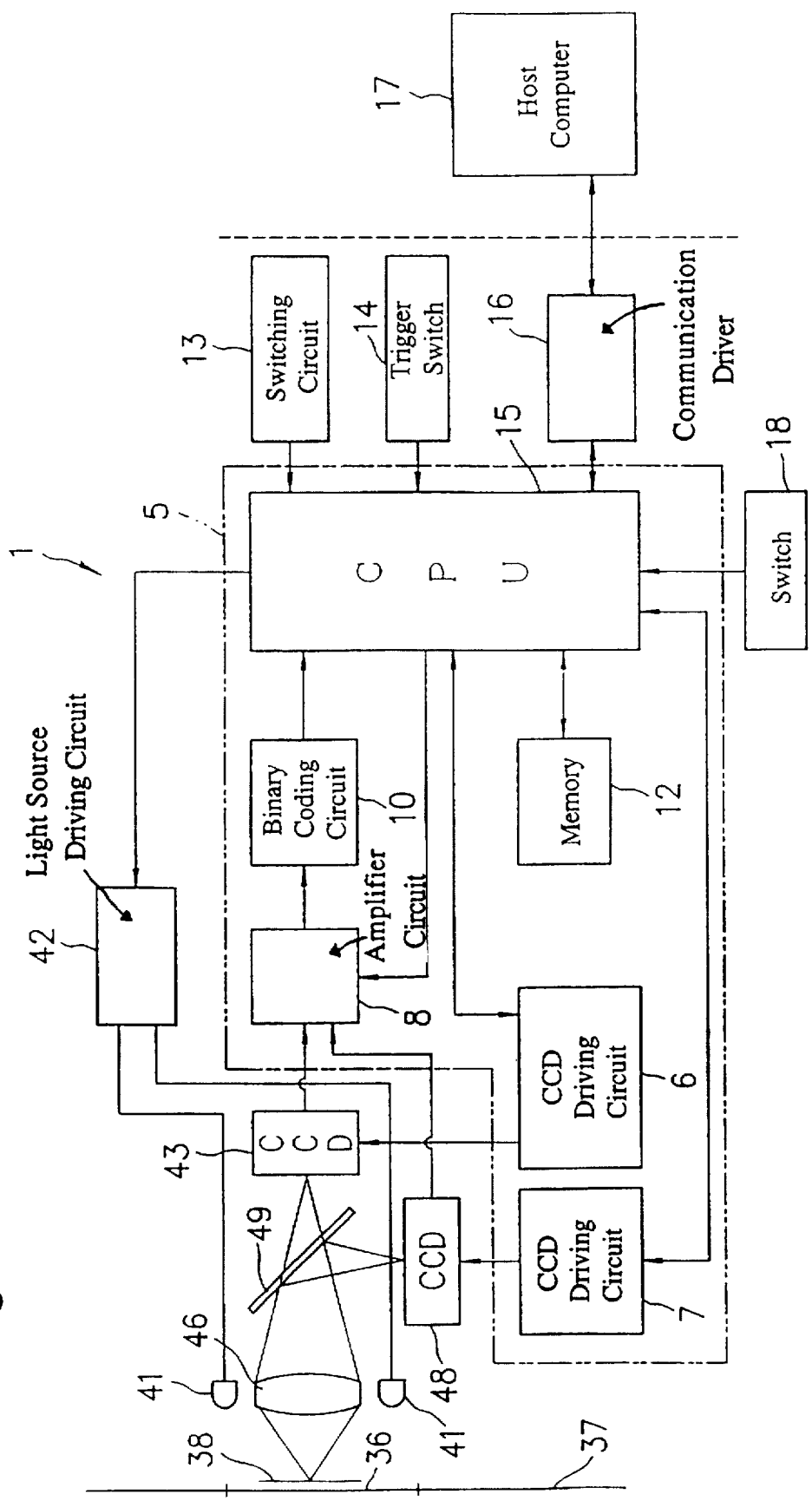
FIG. 5 is a schematic view of the data symbol reader shown in FIG. 1.

The holding portion 21 is provided therein with a signal processing circuit 5, a light source driving circuit 42, and a communication driver 16, as shown in FIG. 5. In the head 22, a reading device 4, which receives light reflected from symbol reading areas 34 and 36, is mounted, as shown in FIG. 3.

A trigger switch 14, which commences a reading operation of the reading device 4, and a switch 18, are provided on one side surface of the casing 2. The switch 18 switches between two modes, namely a first mode, in which a bar code is read, i.e., a one-dimensional data symbol reading mode, and a second mode, in which a two-dimensional data symbol is read, i.e., a two-dimensional data symbol reading mode.

The reading device 4 is provided with a pair of light sources (lighting device) 41, which emit illuminating light onto the symbol reading areas 34 and 36, a line sensor 48, serving as a primary imaging device and consisting of a CCD (charge-coupled device), and an area sensor 43, serving as a secondary imaging device and also consisting of a CCD. The reading device 4 is further provided with an optical system 44, through which light reflected by the symbol reading area 36 (in the present embodiment), is converged onto a light receiving surface of the line sensor 48, and also through which light (in the present embodiment) reflected from the symbol reading area 36, is converged onto a light receiving surface of the area sensor 43. Each component described above is supported by unillustrated supporting members inside the casing 2.

The optical system 44 consists of a mirror 45, a lens (or a lens group) 46 and a half mirror (i.e., a beam splitter) 49. Light reflected by the symbol reading areas 34 and 36, along an optical path 47, is approximately perpendicularly reflected by the mirror 45 towards the lens 46. The lens 46 converges that light reflected by the mirror 45 towards the light receiving surfaces of the area sensor 43 and the line sensor 48. The half mirror 49 respectively splits the light travelling along the optical path 47, i.e., part of the light is transmitted through the half mirror 49 to be converged onto the light receiving surface of the area sensor 43, and part of the light is reflected by the half mirror 49 to be converged onto the light receiving surface of the line sensor 48.

The pair of light sources 41 are symmetrically mounted on both sides of the optical path 47 inside the head 22.

A light emitting element, such as an LED, a halogen lamp, or a semiconductor laser, etc., can be used for the light sources 41. It is possible to provide diffusers having rough or irregular surfaces (not shown) on the light emission surface of the light sources 41, to ensure a uniform brightness of the symbol reading area 36. The light sources 41 are connected to the light source driving circuit 42.

The area sensor 43 consists of a large number of photodiode pixels having a matrix arrangement. Each pixel of the area sensor 43 accumulates electric charges corresponding to the amount of light received. The accumulated electric charges are successively transferred to the signal processing circuit 5 at a predetermined timing, so that the transferred electric charges form image signals of an image read by the area sensor 43.

The line sensor 48 consists of a large number of photodiode pixels having a line arrangement. Each pixel of the line sensor 48 accumulates electric charges corresponding to the amount of light received. The accumulated electric charges are successively transferred to the signal processing circuit 5 at a predetermined timing, so that the transferred electric charges form image signals of an image read by the line sensor 48.

The symbol reading area 36, having an approximate rectangular shape, is formed on a reading surface 37, namely, on the surface at which a data symbol 38 is positioned (i.e., the reference surface). The light emitted from the light sources 41 is converged onto the symbol reading area 36, and the light reflected by the symbol reading area 36 is received by the area sensor 43.

The symbol reading area 34, formed in a strip shape, is an area formed on the reading surface 37, namely, the surface on which a bar code 35 is positioned (i.e., the reference surface), and further is the area onto which light is emitted from the light sources 41 to be reflected thereon towards the line sensor 48 so that the data may be read.

As illustrated in FIG. 3, the data symbol 38 (i.e., the symbol code, or the two-dimensional data symbol) consists of a mosaic pattern (or cells) of white (or transparent) and black areas having a matrix arrangement consisting of x-lines×y-columns, wherein x and y are integers identical to or greater than 2. Each of the "black" or "white" areas represents, for example, a binary number "0" or "1" so that desired information can be obtained by a combination of the signals "0" and "1".

Figure 4:
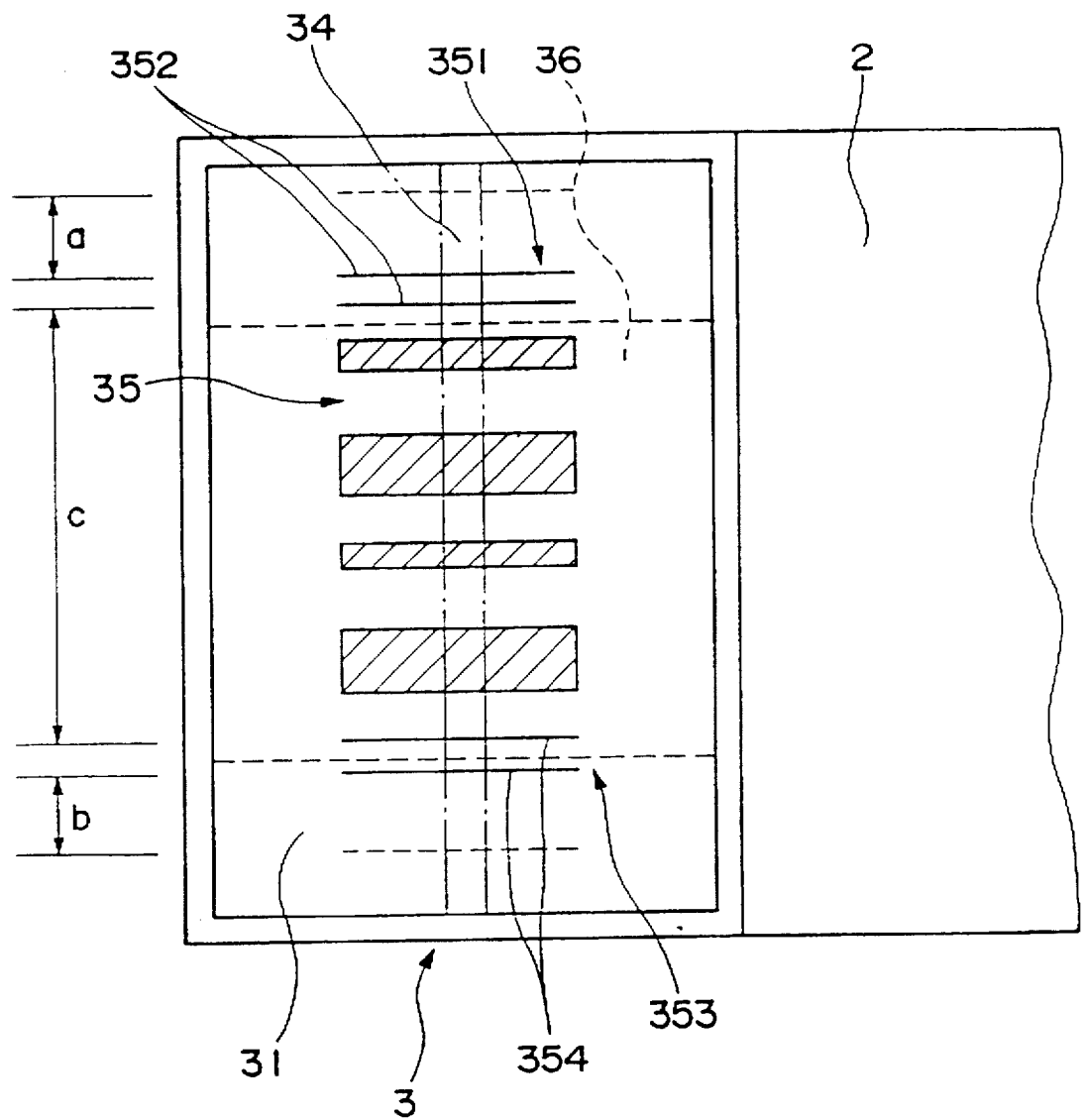
FIG. 4 is another bottom plan view of a housing of the data symbol reader shown in FIG. 1.

In addition, in the present embodiment, as illustrated in FIG. 4, the bar code 35 (i.e., the one-dimensional data symbol) consists of an arrangement of black bars and white spaces, formed between the black bars, both having different widths, each bar or space being aligned in one direction, i.e., in a vertical direction in the present invention. By arranging black bars and white spaces having different widths respectively, desired binary information can be obtained by a series of combinations of the signals "0" and "1".

At one end of the bar code 35, a pair of black bars 352, having a predetermined space therebetween, are positioned which serve as a start symbol (i.e., margin section) 351. At the other end of the bar code 35, a pair of black bars 354, having a predetermined space therebetween, are positioned which serve as a stop symbol (i.e., margin section) 353. It should be understood that the data symbol 38 and the bar code 35 are not limited to the types discussed above.

In the reading device 4 as constructed above, the light sources 41 are driven by the light source driving circuit 42 to emit light toward the symbol reading area 34 or 36. The light reflected from the symbol reading area 34 or 36 is converged onto the light receiving surface of the area sensor 43 or the line sensor 48, after passing through the optical system 44. Thus, an image signal (analogue signal), corresponding to the amount of light received, is produced.

As shown in FIG. 2, the casing 2 is provided with a housing 3 extending lengthways from the reading device 4 towards the symbol reading areas 34 and 36. The housing 3 maintains the reading device 4 to be positioned at a predetermined distance (i.e., the length of the optical path) from the symbol reading areas 34 and 36. In such a manner, the image of the data symbol 38 or the bar code 35, placed at the symbol reading area 34 or 36, is converged onto the light receiving surface of the area sensor 43 or the line sensor 48 through the optical system 44. The housing 3 has a structure to enclose approximately, the optical path of that light emitted from the light sources 41, and the optical path 47 of the light reflected from the symbol reading areas 34 and 36. The cross section parallel to the symbol reading areas 34 and 36 is formed in a rectangular shape, and an opening 31, having a rectangular shape, is formed at the end (top) of the housing 3.

The signal processing circuit 5 is provided, for example, on a printed substrate within the casing 2 to process the image signals supplied from the reading device 4. As may be seen in FIG. 5, the signal processing circuit 5 primarily consists of CCD driving circuits 6 and 7, an amplifier circuit 8, a binary coding circuit 10, a memory 12, a controller 15, in the form of a CPU, and electric connecting lines, etc.

The light source driving circuit 42, the communication driver 16, a trigger switch 14, and a switching circuit 13 of a power source switch, namely a main switch, are connected to the controller 15. In accordance with need, an unillustrated indicator, such as an LED (light emitting diode), LCD (liquid crystal display), CRT (cathode ray tube) or the like, is further connected to the controller 15.

A mode setting means sets a mode, namely, either a first mode, to read the bar code (i.e., the one-dimensional data symbol), or a second mode, to read the two-dimensional data symbol. A switching means switches the reading of information operation, indicated by the data symbol, according to the dimensions of the data symbol. The primary functions of the mode setting means and the switching means are operated respectively by the controller 15.

The operation of the data symbol reader 1 will now be described. Firstly, the overall structure thereof will be described.

In the data symbol reader 1, when the switch 18 is turned OFF, the first mode is set to read the bar code (the one-dimensional data symbol), and when the switch 18 is turned ON, the second mode is set to read the two-dimensional data symbol.

In the second mode, when the trigger switch 14 is turned ON, the image is picked-up by the area sensor 43. In the first mode, when the trigger switch 14 is turned ON, the image is picked-up by the line sensor 48. The signal processing circuit 5 performs a predetermined signal processing operation. The signal processed through the signal processing circuit 5 is decoded into the required data, and is then input to an external host computer 17, such as a personal computer, a work station or the like, through the communication driver 16. In the host computer 17, the data input thereto is stored and calculated.

The light source driving circuit 42, controlled by the controller 15, supplies the light sources 41 with electrical power for turning the light sources 41 ON. When a main switch (not shown) or the trigger switch 14 is turned ON, the controller 15 actuates the light source driving circuit 42 to energize the light sources 41. The lighting time of the light sources 41 is appropriately determined by the light source driving circuit 42.

When the main switch is turned ON, the controller 15 actuates the CCD driving circuits 6 and 7 respectively. Consequently, the CCD driving circuits 6 and 7 respectively supply CCD transfer clock signals to the area sensor 43 and the line sensor 48, corresponding to each respective charge transfer device (not shown). In such a manner, storage and transfer of the signal charges are controlled.

The CCD driving circuits 6 and 7 generate clock signals so that composite signals, consisting of the clock signals and vertical and horizontal synchronization signals added thereto (i.e., the composite clock signals), can be transferred therefrom to the controller 15.

In the second mode, the image signal (analogue signal) is successively output from the area sensor 43 of the reading device 4. Subsequently, the image signal is amplified through the amplifier circuit 8, and converted into a digital image signal through an unillustrated A/D converter, before being input to the binary coding circuit 10. The amplifier circuit 8 is controlled by the controller 15, and the rate of amplification is set at a predetermined value according to the present mode, namely, either the first mode or the second mode.

In the binary coding circuit 10, the digital image signal is compared with threshold value data to obtain binary code data. The binary code data, obtained through the binary coding circuit 10, is stored in the memory 12 at predetermined addresses designated by an address counter (not shown) incorporated in the controller 15. The address counter is driven in response to the composite clock signal input from the CCD driving circuit 6.

The data stored in the memory 12 is successively read therefrom in accordance with the addresses designated by the address counter. There may be a case that the reading order is reversed when the data is memorized in the memory 12. Data for one picture plane is subject to various image processing operations including an outline detection (i.e., extraction of data only for the data symbol 38), a drop-out correction, rotation, etc., and is then decoded by a decoder (not shown) incorporated in the controller 15, in accordance with the two-dimensional data symbol 38. In other words, the information indicated by the data symbol 38 is deciphered. The decoded data is output to the host computer 17 through the communication driver 16.

In the first mode, the image signal (analogue signal) is successively output from the line sensor 48 of the reading device 4. The image signal is subsequently amplified through the amplifier circuit 8, and converted into the digital image signal through the unillustrated A/D converter, before being input to the binary coding circuit 10.

In the binary coding circuit 10, likewise the case of the second mode, the digital image signal is converted into binary code data through the binary coding circuit 10. The obtained binary code data is once stored in the memory 12 at predetermined addresses designated by the address counter (not shown) incorporated in the controller 15. Then the binary data is read from the designated address in the memory 12. In the operation part of the controller 15, data for one line (i.e., one picture plane) is subject to various image processing operations, such as a margin section detection (i.e., the white areas having more than a specified width are detected as the margin sections "a" and "b", shown in FIG. 4), and through detection of the image data area to be decoded (i.e., the decoding area "c", shown in FIG. 4), is then decoded by a decoder incorporated in the controller 15, in accordance with the bar code 35, namely, the one-dimensional data symbol. In other words, the information indicated by the bar code 35 is deciphered. The decoded data is output to the host computer 17 through the communication driver 16.

A more detailed explanation of the operation of the controller 15 of the data symbol reader 1 in the present invention will now be given.

Figure 6:
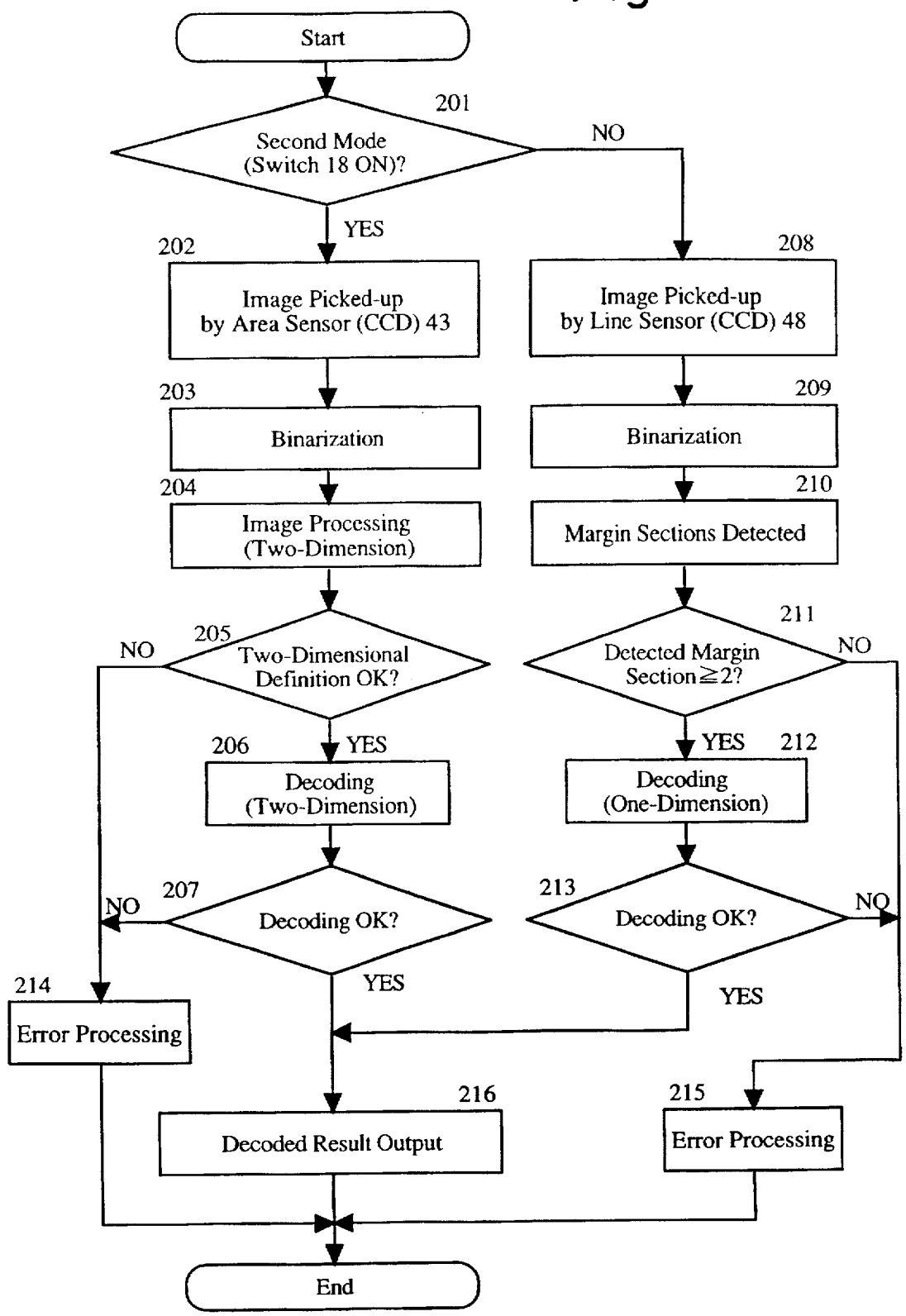
FIG. 6 is a flow chart showing an operation of a controlling means in the present invention.

FIG. 6 shows a flow chart of the operation of the controller 15 of the data symbol reader 1 in the present embodiment.

At Step 201, when the trigger switch 14 is turned ON, the state of the switch 18 is checked whether, i.e., whether the switch 18 is ON or OFF, namely, the present mode is judged.

If the mode is judged to be the second mode at Step 201, the image is picked-up by the area sensor 43 at Step 202.

Then, at Step 203, the image data (image signal) supplied from the area sensor 43 is binarized, and the obtained binary data (binary signal) is stored in the memory 12.

At Step 204, in regard to the obtained binary data at Step 203, the predetermined image processings, such as an outline detection as previously described, are executed.

At Step 205, it is judged whether it is possible to define two-dimensions. The four outer sides of the data symbol 38 are in black so that the outline of the data symbol 38 may be recognized. The binary data corresponding to the black pixels at the outermost part of the data symbol 38 is searched and extracted, thus the outline of the data symbol 38 is detected. Then the area, enclosed by the black pixels which comprise the outline of the data symbol 38, is recognized as the decoding area.

Further at Step 205, as a result of searching the binary data corresponding to the black pixels at the outermost part of the data symbol 38, if the search commences from any starting point and succeeds in returning to the starting point (i.e., if detection of the outline of of the data symbol 38 is accomplished), the two-dimensional definition is judged to be OK. While, if the search is not completely made, or if the search is incapable of starting (i.e., if the detection of the outline of the data symbol 38 ends in failure), the two-dimensional definition is judged to be in error.

For example, if the image is picked-up in a state that the data symbol 38 is included in the symbol reading area 36, the two-dimensional definition is judged to be OK. While, if the image is picked-up in such a state that any part of the data symbol 38 is out of the symbol reading area 36, or that there is no data symbol 38 in the symbol reading area 36, the two-dimensional cut is judged to be in error.

If the two-dimensional definition is judged to be OK at Step 205, then at Step 206, in regard to the binary data drawn from the decoding area, the decoding is operated, i.e., the information indicated by the data symbol 38 is deciphered.

Then at Step 207, it is judged whether the decoding is OK or not. At Step 207, if the appropriate decoded data is obtained, the decoding is judged to be OK, while if the appropriate decoded data is not obtained, the decoding is judged to be in error NG (no good).

If the two-dimensional definition is judged to be in error at Step 205, or if the decoding is judged to be in error at Step 207, the predetermined error processing is executed at Step 214. In the error processing, for example, the code NG is indicated.

On the other hand, if the mode is judged not to be the second mode at Step 201, namely, if the switch 18 is judged to be turned OFF, the image is picked-up by the line sensor 48 at Step 208.

Then, at Step 209, the image data (image signal), supplied from the line sensor 48, is binarized and the obtained binary data (binary signal) is stored in the memory 12.

At Step 210, in regard to the obtained binary data at Step 203, the margin sections are detected. Further at Step 211, it is judged whether there are not less than two margin sections, namely, the start symbol 351 and the stop symbol 352. In other words, it is judged whether not less than two margin sections are detected or not.

If it is judged that not less than two margin sections are detected at Step 211, the image data area between the two margin sections is recognized as the decoding area. Then at Step 212, in regard to the binary data in the decoding area, the decoding is operated, i.e., the information indicated by the bar code 35 is deciphered.

Then at Step 213, it is judged whether or not the decoding is OK. At Step 213, if the appropriate decoded data is obtained, the decoding is judged to be OK, while if the appropriate decoded data is not obtained, the decoding is judged to be in error (NG).

If it is judged that more than one margin section is not detected at Step 211, namely, if the number of detected margin sections is less than 2 and it is impossible to recognize the decoding area, or if the decoding is judged to be in error at Step 213, the predetermined error processing is executed at Step 215. In the error processing, for example, the code NG is indicated.

If the decoding is judged to be OK at Step 207, or if the decoding is judged to be OK at Step 213, the decoded data is transmitted (output) to the host computer 17 through the communication driver 16 at Step 216. Then the present routine is ended.

As described above, in the data symbol reader 1 of the present embodiment, by using the area sensor 43 and the line sensor 48, it is possible to read both the data symbol 38 and the bar code 35.

The conventional data symbol reader, which uses only the line sensor, is commonly provided with a scanning device to read the two-dimensional data symbol. However, in the data symbol reader 1 of the present embodiment, such a scanning device is not necessary. Therefore, compared with the conventional data symbol reader which uses only the line sensor, the data symbol reader 1 in the present embodiment has a simpler structure, a capacity to be miniaturized, and a higher durability.

A second embodiment of a data symbol reader of the present invention will now be discussed with reference to FIGS. 7 and 8. Since the second embodiment of the present invention is similar to the first embodiment, only those features unique to the second embodiment will be described.

A data symbol reader 1a is provided with a judging means to judge whether the imaged data symbol is the bar code (i.e., the one-dimensional data symbol) or the two-dimensional data symbol, and the reading of the data symbol is operated according to the dimension of the data symbol judged through the judging means. The judging means in the present embodiment, judges whether the outline of the two-dimensional data symbol is detected or not, and whether not less than two margin sections are detected or not, and such judgements are operated through the controlling means 15.

Figure 7:
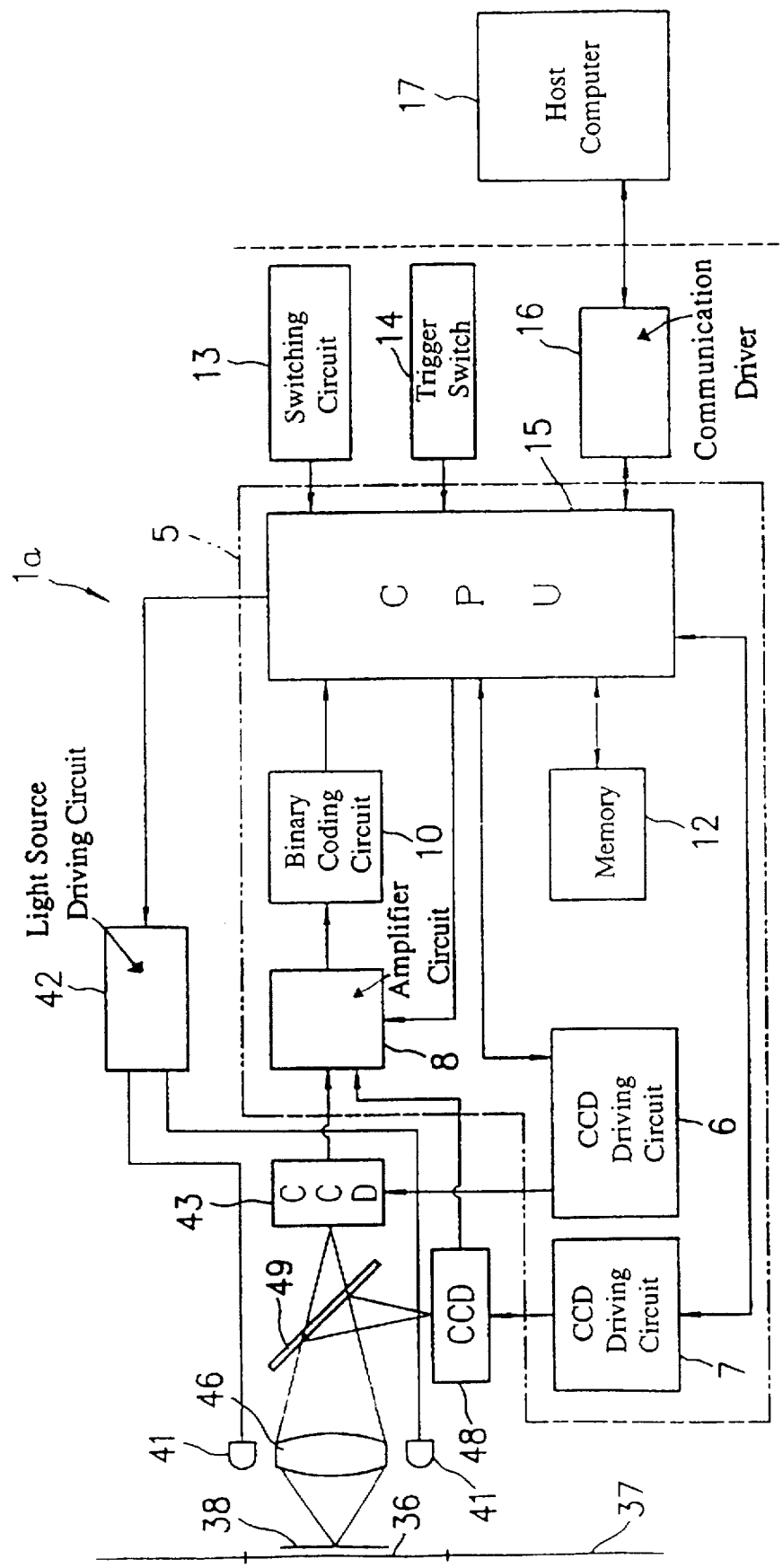
FIG. 7 is a schematic view of a data symbol reader according to a second embodiment of the present invention.

As illustrated in FIG. 7, the structure of the data symbol reader 1a is almost identical to the structure of the data symbol reader 1 of the first embodiment, except that the switch 18 is not provided in the data symbol reader 1a.

An operation of the controller 15 of the data symbol reader 1a of the present embodiment will now be described.

Figure 8:
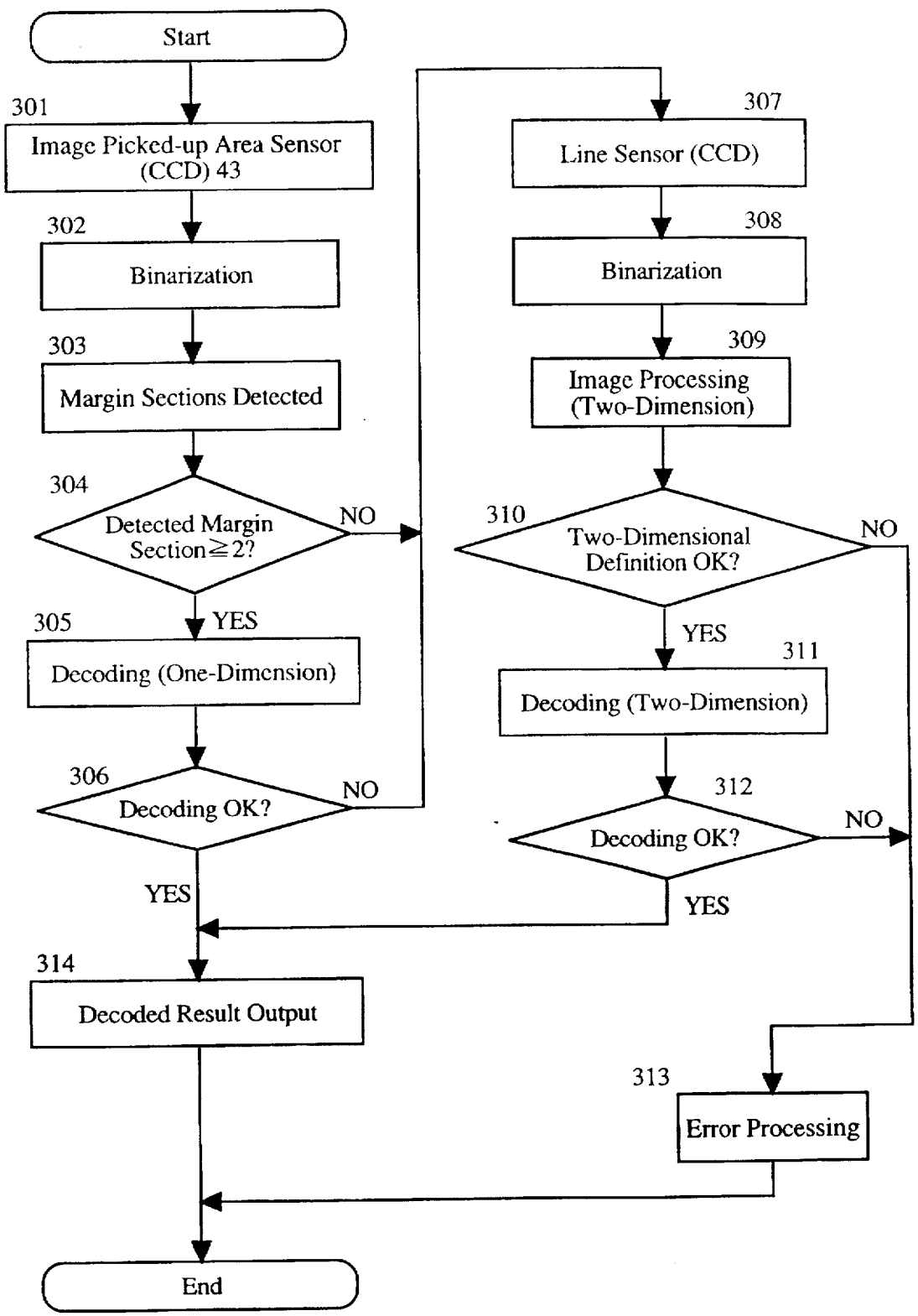
FIG. 8 is a flow chart showing an operation of a controlling means of the second embodiment of the present invention.

FIG. 8 shows a flow chart of the operation of the controller 15 of the data symbol reader 1a in the present embodiment.

At Step 301, when the trigger switch 14 is turned ON, the first mode is set, and the image is picked-up by the line sensor 48.

Then at Step 302, the image data (image signal) supplied from the line sensor 48 is binarized, and the obtained binary data (binary signal) is stored in the memory 12.

At Step 303, in regard to the obtained binary data at Step 302, the margin sections are detected. Then at Step 304, it is judged whether there are not less than two margin sections, namely, whether not less than two margin sections are detected or not.

If it is judged that not less than two margin sections are detected at Step 304, the image data area between the two margin sections is recognized as the decoding area. Then at Step 305, in regard to the binary data in the decoding area, the decoding is operated, i.e., the information indicated by the bar code 35 is deciphered.

Then at Step 306, it is judged whether the decoding is OK or not. At Step 304, if it is judged that more than one margin section is not detected, namely, if the number of detected margin sections is less than 2 and it is impossible to recognize the decoding area, or if the decoding is judged to be in error at Step 306, the mode is set to be the second mode, and at Step 307, the image is picked-up by the area sensor 43.

Then at Step 308, the image data (image signal) supplied from the area sensor 43 is binarized, and the obtained binary data (binary signal) is stored in the memory 12.

At Step 309, in regard to the obtained binary data at Step 308, the predetermined image processes, such as an outline detection, are executed.

At Step 310, it is judged whether or not it is possible to define in two-dimensions. At Step 310, for example, if the image is picked-up in a state that the data symbol 38 is included in the symbol reading area 36, the two-dimensional definition is judged to be OK. While if the image is picked-up in such a state that any part of the data symbol 38 is outside of the symbol reading area 36, or that there is no data symbol 38 in the symbol reading area 36, the two-dimensional definition is judged to be in error.

If the two-dimensional definition is judged to be OK at Step 310, then at Step 311, in regard to the binary data drawn from the decoding area, the decoding is operated, i.e., the information indicated by the data symbol 38 is deciphered.

Then at Step 312, it is judged whether the decoding is OK or not. If the two-dimensional definition is judged to be in error at Step 310, or if the decoding is judged to be in error at Step 312, the predetermined error processing is executed at Step 313.

If the decoding is judged to be OK at Step 306, or if the decoding is judged to be OK at Step 312, the decoded data is transmitted (output) to the host computer 17 through the communication driver 16 at Step 314. Then the present routine is ended.

As described above, in the data symbol reader 1a of the present embodiment, it is possible to read both the data symbol 38 and the bar code 35 by using the area sensor 43 and the line sensor 48. In addition, compared with the conventional data symbol reader which uses only the line sensor, the data symbol reader 1a in the present embodiment has a simpler structure, a capacity for miniaturization, and a higher durability.

The data symbol reader 1a is further provided with a function capable of distinguishing between the data symbol 38 and the bar code 35, and the mode switching is operated automatically according to the result of distinction, and the reading is operated. Therefore, compared with the data symbol reader 1 of the first embodiment which switches the mode through a manual operation of the switch 18, the data symbol reader 1a is provided with a simpler operation, and is capable of reading the data symbol 38 or the bar code 35 accurately.

A third embodiment of a data symbol reader according to the present invention will now be described with reference to FIG. 9. Since the third embodiment is similar to the first embodiment of the present invention, only those features unique to the third embodiment will be described.

Figure 9:
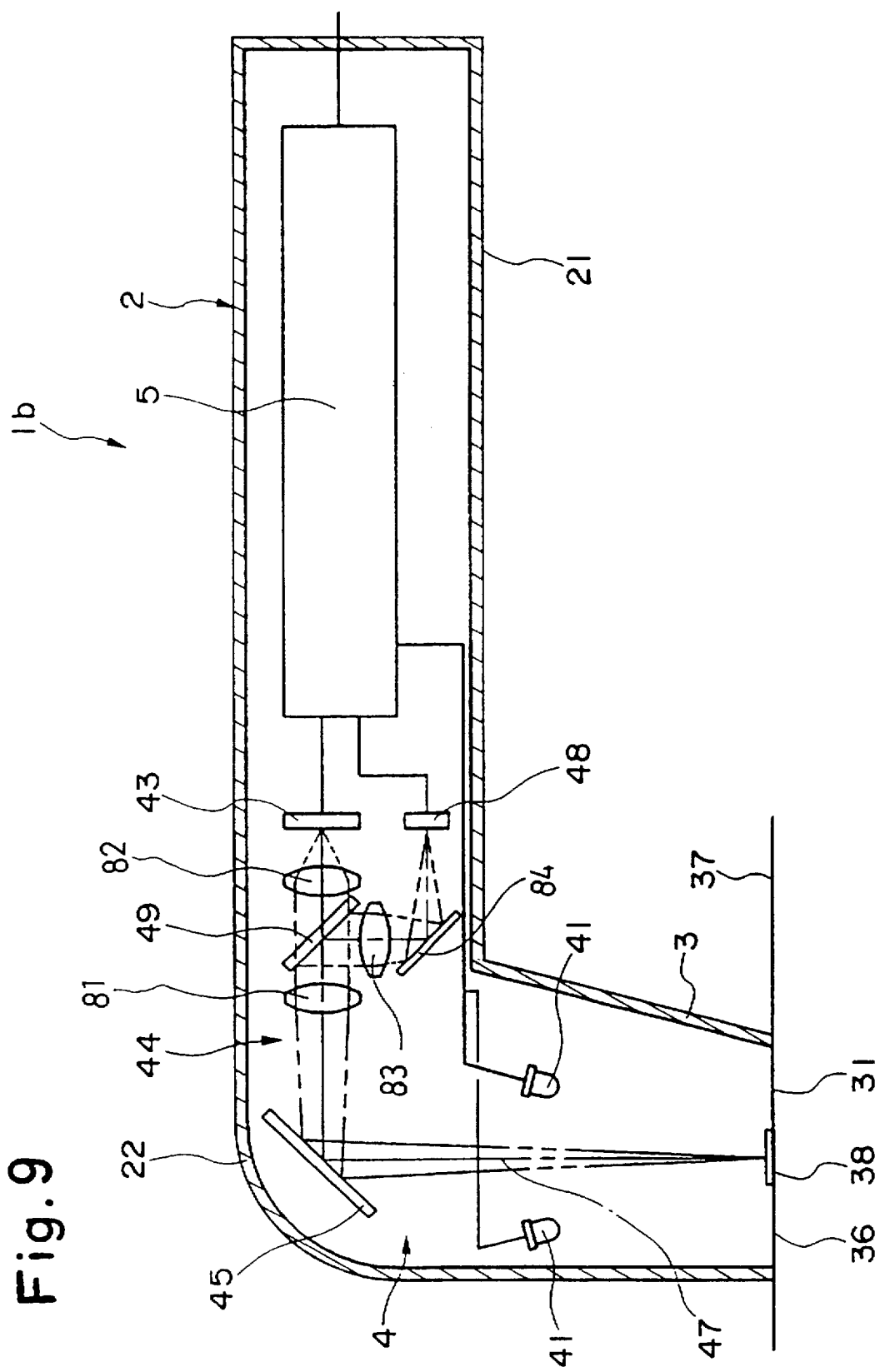
FIG. 9 is a longitudinal sectional view of a data symbol reader according to a third embodiment of the present invention.

As illustrated in FIG. 9, a data symbol reader 1b is provided with a lens 83 positioned between the half mirror 49 and the line sensor 48, and a mirror 84 which approximately perpendicularly reflects that light transmitted through the lens 83 towards the line sensor 48. In addition, a lens 82 is provided between the half mirror 49 and the area sensor 43, and a lens 81 is provided between the mirror 45 and the half mirror 49.

In the present embodiment the image of the bar code 35 is converged onto the light receiving surface of the line sensor 48 through the lenses 81 and 83. In such a manner, a first converging optical system is structured in order to set a magnification of an image converged onto the line sensor 48 (i.e., image magnification). Further the image of the data symbol 38 is converged onto the light receiving surface of the area sensor 43 through the lenses 81 and 82, and in such a manner, a second converging optical system is structured in order to set a magnification of an image converged onto the area sensor 43.

The lenses 81, 82 and 83 are set in advance in such a way that the magnifications of the images converged onto the area sensor 43 and the line sensor 48 may be predetermined values, respectively.

For reference, here the word "magnification" refers to "lateral magnification", namely, the ratio of the "size of the image/size of the object (subject)", and the relationship between the magnification and the focal length can be determined as follows:

Magnification = Focal Length/(Image Pickup Distance − Focal Length)

In the data symbol reader 1b, since the subject is positioned on the reading surface 37, the image pickup distance mentioned above is constant. It should be understood that the term image pickup distance refers to the distance between the reading surface 37 and the sensors 43, 48.

Therefore, in regard to setting the magnification in the data symbol reader 1b, it is possible to set focal lengths of the first converging optical system and the second converging optical system respectively at any time. The focal length of the first converging optical system equals the composite focal length of the lenses 81 and 83, and the focal length of the second converging optical system equals the composite focal length of the lenses 81 and 82.

The lens 81 is a common lens used for both the first and the second converging optical system. Therefore, the lenses 82 and 83 are selected and positioned in such a manner that, considering the focal length and the focal position of the lens 81, the magnifications of the images converged onto the line sensor 48 and the area sensor 43 eventually become the predetermined magnifications.

The structure and the operation of the data symbol reader 1b, such as the operation of the controller 15, is almost the same as the structures and the operations of the data symbol readers 1 and 1a. Therefore, no explanation shall be given.

In the data symbol reader 1b of the present embodiment, likewise the cases of the data symbol readers 1 and 1a, it is possible to read the data symbol 38 and the bar code 35 by using the area sensor 43 and the line sensor 48 consisting of a sufficient number of pixels. In such a manner, the size of the data symbol reader can be minimized. In addition, compared with the data symbol reader which switches the mode through a manual operation, the data symbol reader 1b is capable of an easier operation, and a more appropriate and accurate reading of the data symbol 38 or the bar code 35.

In addition, in the data symbol reader 1b, there are two converging optical systems, namely the first converging optical system, i.e., the lenses 81 and 83, which sets the magnification of images converged onto the line sensor 48, and the second converging optical system, i.e., the lenses 81 and 82, which sets the magnification of images converged onto the area sensor 43. Therefore, it is possible to set the magnifications of the images independently, namely, the magnification of the image converged onto the line sensor 48, i.e., the image of the bar code 35, and the magnification of the image converged onto the area sensor 43, i.e., the image of the data symbol 38.

In such a manner, it is possible to independently set, for example, arrangements of the sizes and the lengths of the symbol reading areas 36 and 34, namely, the maximum readable sizes of the data symbol 38 and the bar code 35, with the resolutions thereof. Such arrangements may also be set considering the sizes or lengths of the area sensor 43 and the line sensor 48, so that the data symbol 38 and the reading of the bar code 35 may be read independently.

Further, for example the magnification of the lens 83 may be set smaller, and accordingly the line sensor 48 consisting of a smaller number of pixels (i.e., the line sensor 48 is smaller) may be used. In such a manner, the size of the data symbol reader 1b may further be minimized.

Figure 10:
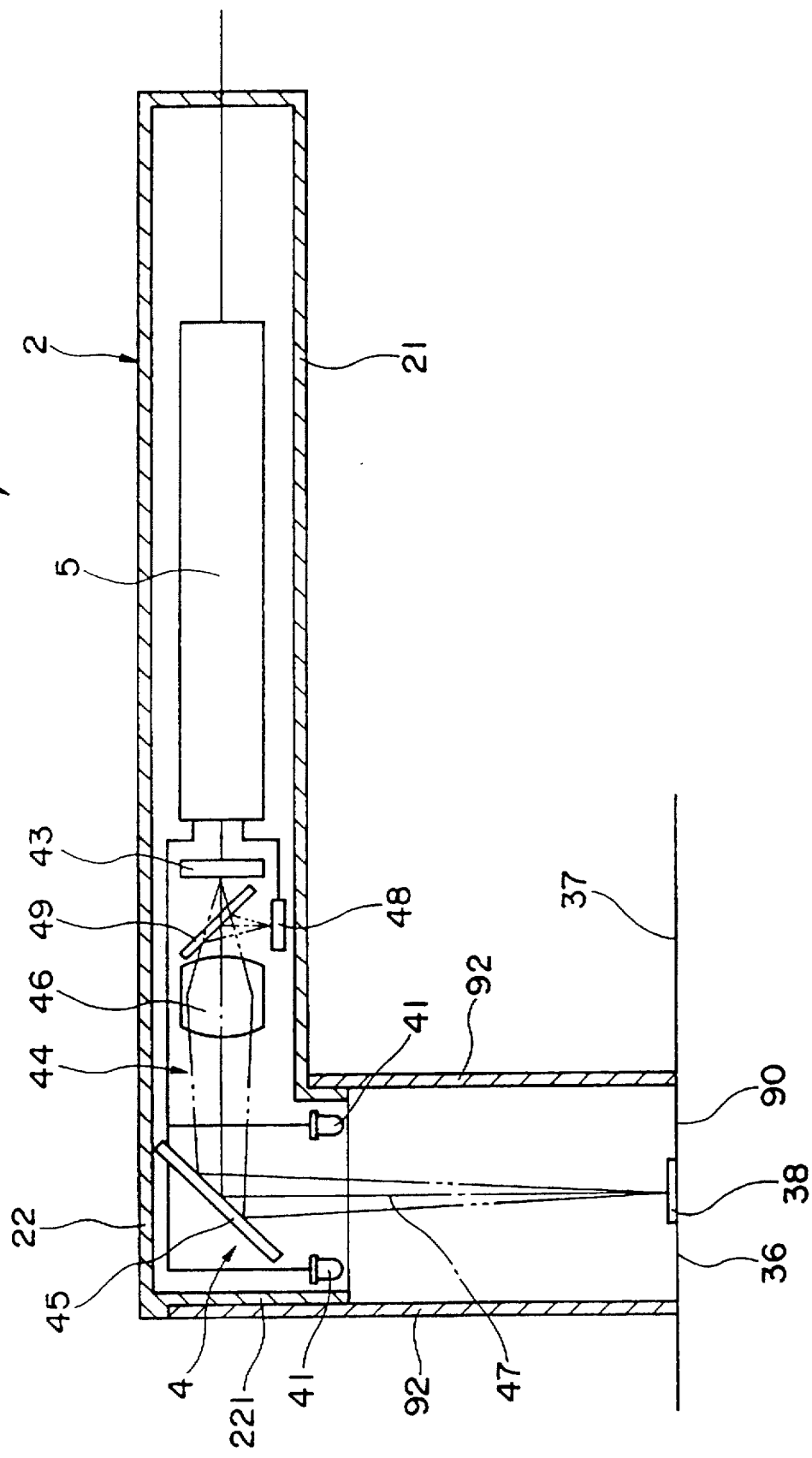
FIG. 10 is a longitudinal sectional view of a data symbol reader according to a fourth embodiment of the present invention.
Figure 11:
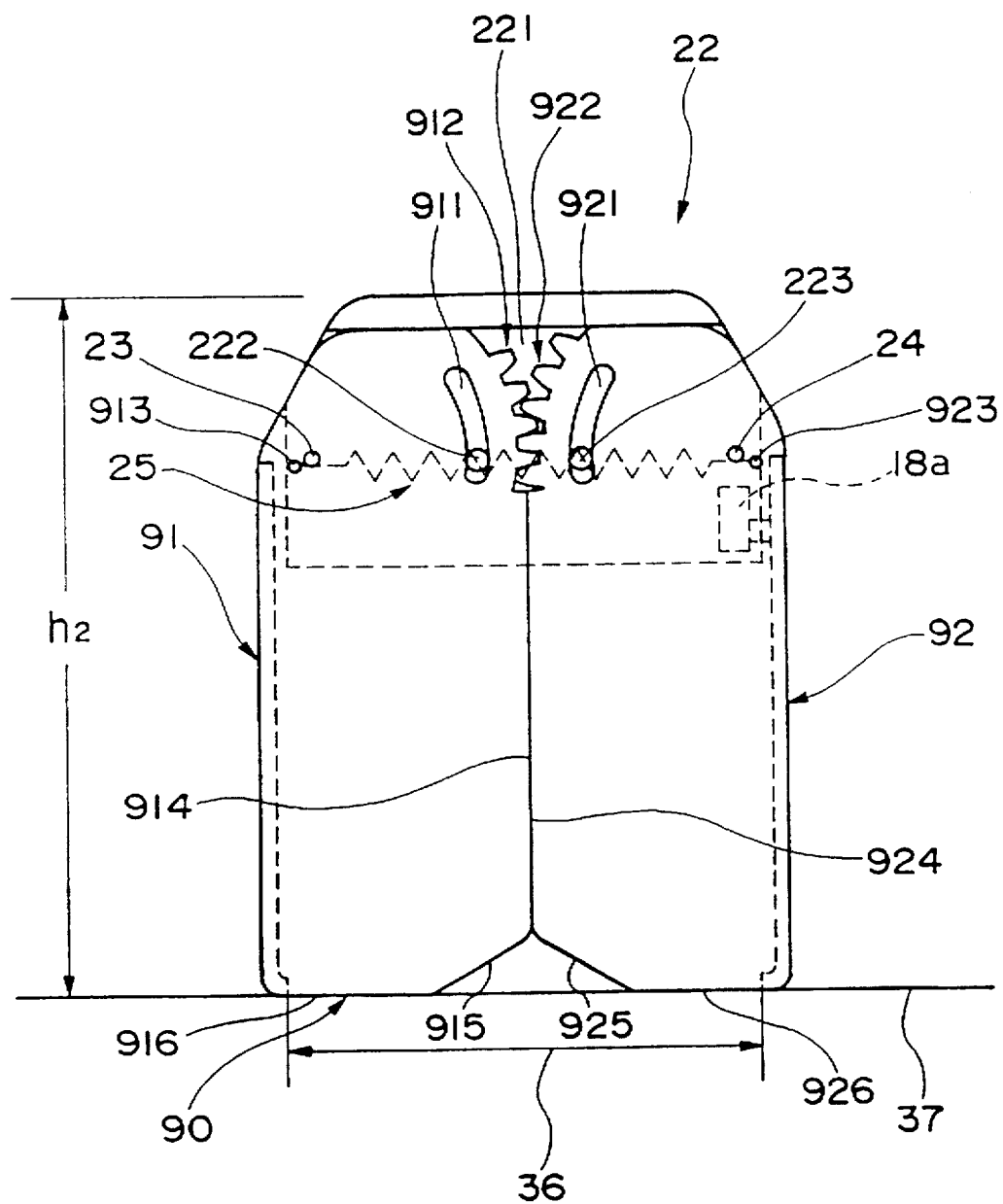
FIG. 11 is a front elevational view of the data symbol reader shown in FIG. 10.

FIGS. 10 and 11 illustrate a fourth embodiment of the present invention. In the present embodiment, positioning for the different data symbols in the one-dimension and the two-dimension, may be performed easily.

Figure 12:
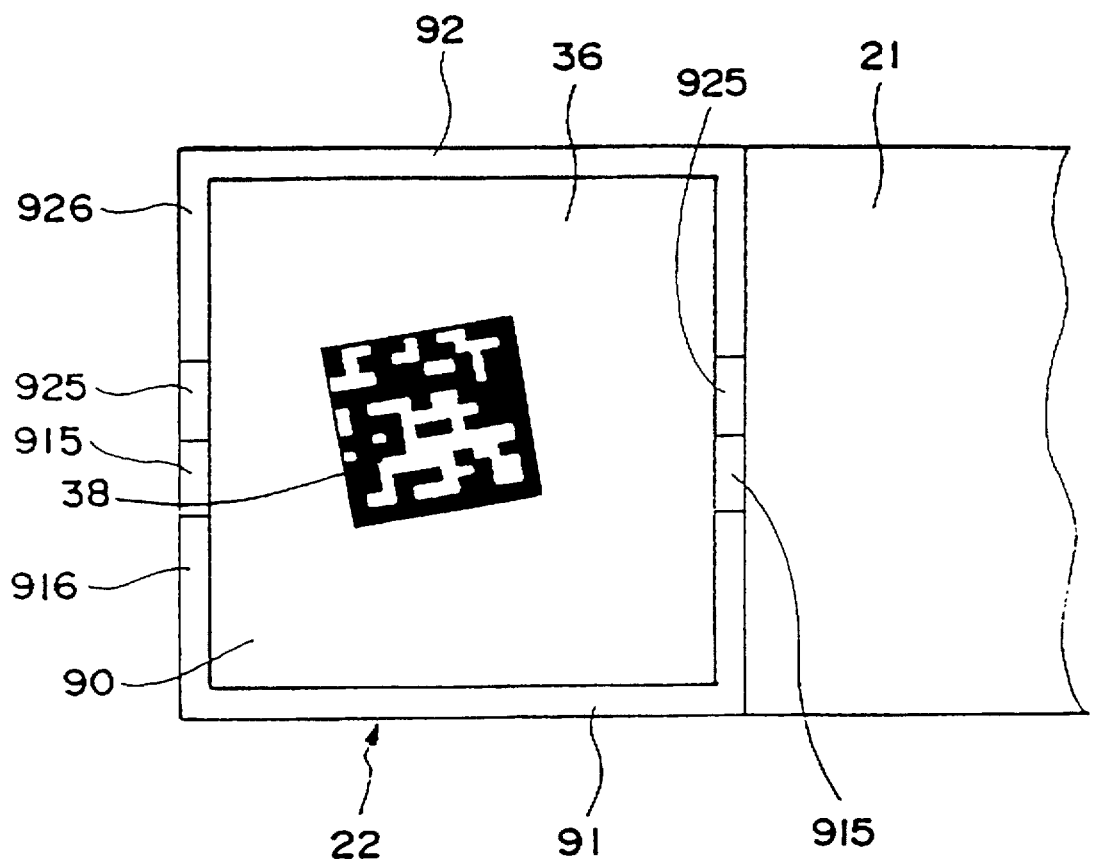
FIG. 12 is a bottom plan view of a head of the data symbol reader shown in FIG. 10.

In the present embodiment, the head 22 of the casing 2 is provided with a pair of opening members 91 and 92, as shown in FIG. 12, extending lengthways from the reading device 4 to the symbol reading areas 36 and 34. The opening members 91 and 92 serve as guide members, by which the image of the data symbol 38 positioned on the symbol reading area 36, or the image of the bar code 35 positioned on the symbol reading area 34, are converged onto the light receiving surface of the area sensor 43 or the line sensor 48 through the optical system 44. The opening members 91 and 92 also serve to indicate the symbol reading areas 36 and 34.

As shown in FIG. 11, the opening members 91 and 92 are respectively rotatively supported by pins 23 and 24 acting as pivots thereof, against a front wall 221. The opening members 91 and 92 are rotated to open or close, and accordingly the shape of an opening 90 may vary. In such a manner, the opening members 91 and 92 serve as an opening shape varying means to vary the shape of the opening 90.

On the front wall 221, projections 222 and 223 which project into the front part of the head 22, are provided.

The respective cross sections of the opening members 91 and 92, parallel to the symbol reading area 36, are approximately in the shape of a letter U. The opening members 91 and 92 are positioned symmetrically so that the concave surfaces on the inner peripheries of each one may be opposed.

On the bases of the opening members 91 and 92, slits 911 and 921, having an arched shape, are respectively provided. The pins 23 and 24 respectively serve as pivots for the arcs. The projections 222 and 223 are respectively inserted in the slits 911 and 921.

Gears 912 and 922 are respectively provided on outer peripheries of the slits 911 and 921. The gears 912 and 922 engage with each other. Through the engagement of the gears 912 and 922, the opening members 91 and 92 are capable of moving rotatively, in opposite directions, i.e., away from or towards each other, synchronized with each other, and by the same angle. In such a manner, the gears 921 and 922 serve as power transmitting means, to transmit the rotating power from one opening member to the other opening member, and to rotate the opening members 91 and 92, synchronized with each other, by an identical angular movement.

Figure 13:
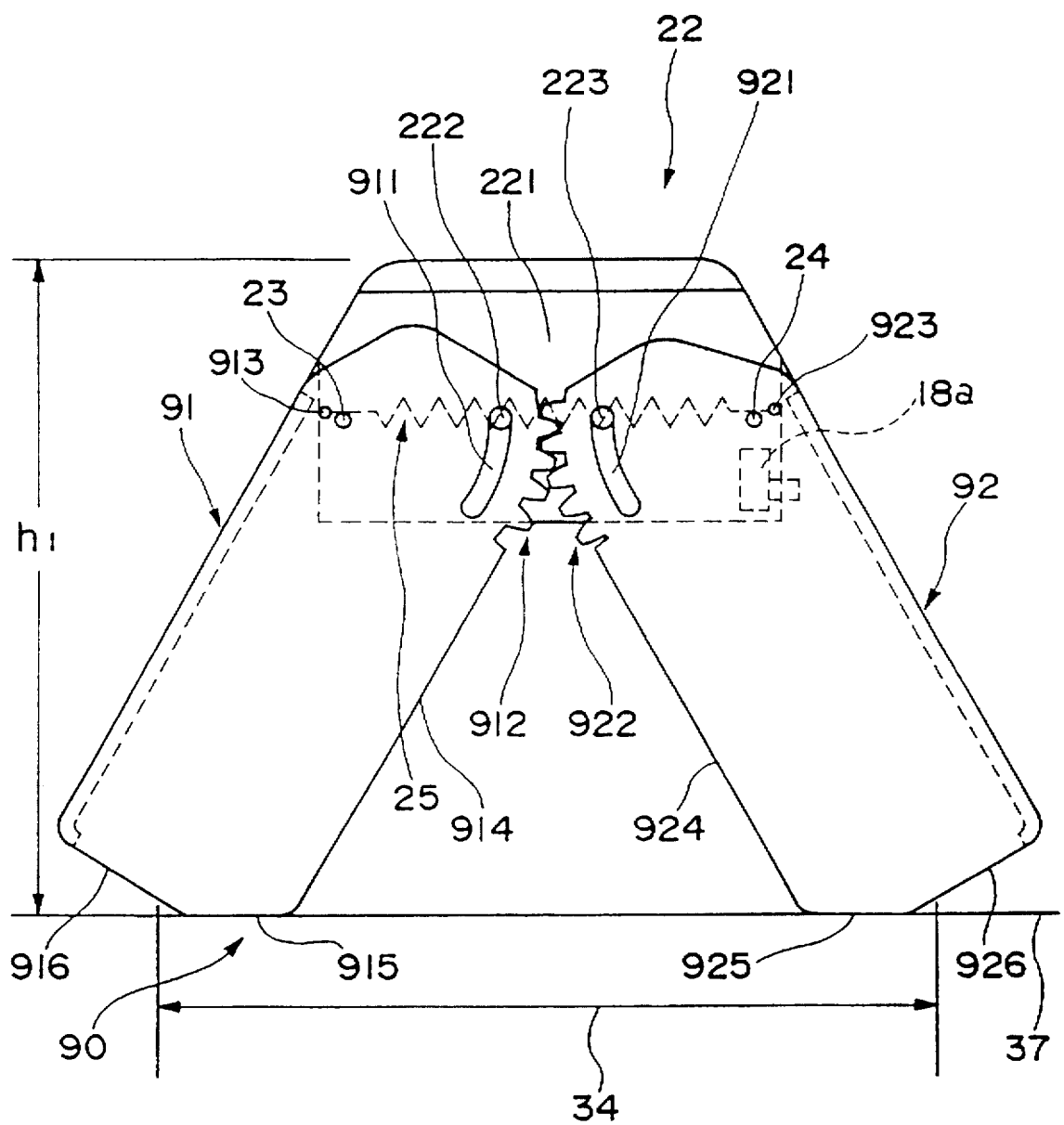
FIG. 13 is a front elevational view of the data symbol reader shown in FIG. 10.
Figure 14:
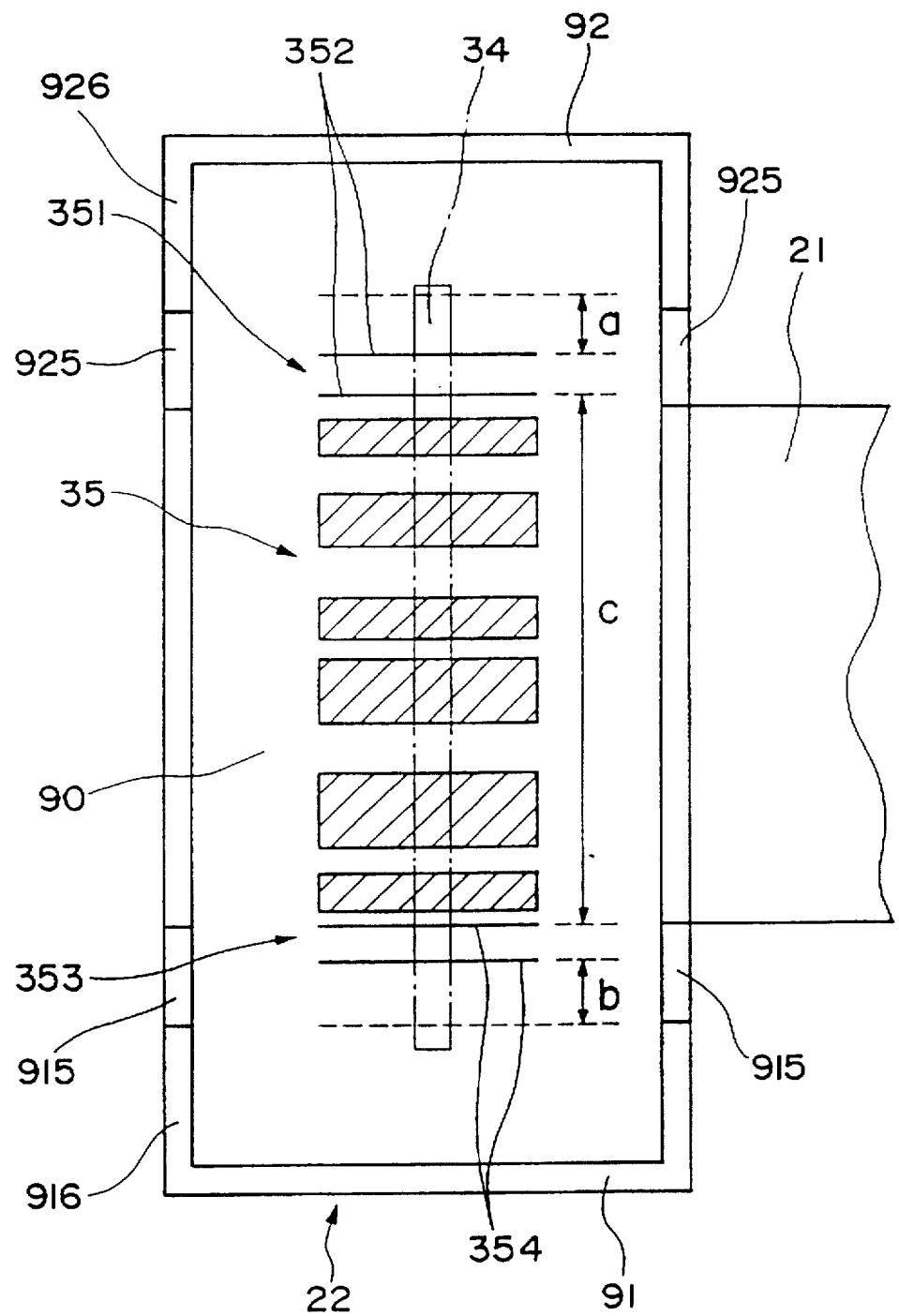
FIG. 14 is a bottom plan view of a head of the data symbol reader shown in FIG. 10.

At the top (the bottom as viewed in FIG. 11) of the opening member 91, a top surface 916, and a slant surface 915 slanted away from the top surface 916 by a predetermined angle, are provided. At the top of the opening member 92, a top surface 926, and a slant surface 925 slanted away from the top surface 926 by a predetermined angle, are provided. In such a manner, the height of the head 22 in a secondary position (h2), when the opening members 91 and 92 are closed as shown in FIG. 11, and the height of the head 22 in a primary position (h1), when the opening members 91 and 92 are opened as shown in FIG. 13, are approximately the same as each other. Therefore, the opening member 91 is designed so that the distance between the pin 23 and the slant surface 915, in the primary position, and the distance between the pin 23 and the top surface 916, in the secondary position, may approximately be the same. In the same manner, the opening member 92 is designed so that the distance between the pin 24 and the slant surface 925, in the primary position, and the distance between the pin 24 and the top surface 926, in the secondary position, may approximately be the same.

As illustrated in FIG. 11, when the opening members 91 and 92 are closed, the top surfaces 916 and 926 are in contact with the reading surface 37, and as illustrated in FIG. 13, when the opening members 91 and 92 are opened, the slant surfaces 915 and 925 are in contact with the reading surface 37.

Due to the opening members 91 and 92 in the present embodiment, and especially due to the top surfaces 916 and 926 and the slant surfaces 915 and 925 thereof, an approximate same length may be obtained in regard to two optical paths in different states of the opening members 91 and 92. Namely, the length of the optical path from the area sensor 43 to the top opening 90 when the opening members 91 and 92 are closed (i.e., the length of the optical path from the area sensor 43 to the top surfaces 916 and 926), and the length of the optical path from the line sensor 48 to the top opening 90 when the opening members 91 and 92 are opened (i.e., the length of the optical path from the line sensor 48 to the slant surfaces 915 and 925), are approximately the same.

More precisely, the distance from the pin 23 to the top surface 916, in a closed state, and the distance from the pin 23 to the slant surface 915, in an open state, are the same, and similarly, the distance from the pin 24 to the top surface 926, in a closed state, and the distance from the pin 24 to the slant surface 925, in an open state, are the same. Therefore, the distance between the object and the image when the opening members 91 and 92 are opened, and the distance between the object and the image when the opening members 91 and 92 are closed, are maintained to be approximately the same with each other. With such an arrangement, the image of the data symbol 38 or the bar code 35 is accurately converged onto the light receiving surfaces of the area sensor 43 and the line sensor 48, respectively.

Therefore, the length of the opening members 91 and 92 are respectively designed such that when the top surfaces 916 and 926 or the slant surfaces 915 and 925 are in contact with the reading surface 37, the light from the symbol reading areas 36 and 34 may respectively be converged onto the light receiving surfaces of the area sensor 43 and the line sensor 48 through the optical system 44.

As illustrated in FIG. 11, when the opening members 91 and 92 are in a closed state, the opening members 91 and 92 approximately enclose the two optical paths, namely the optical path of the light emitted from the light source 41, and the optical path of the light reflected from the symbol reading areas 36 and 34. In this case, the cross section parallel to the symbol reading area 36 is a rectangular shape. Consequently, at the top of the opening members 91 and 92, the top opening 90 is formed in a rectangular shape. The shape of the top opening 90 approximately corresponds to the shape of the symbol reading area 36, as shown in FIG. 12.

On the other hand, as illustrated in FIG. 13, when the opening members 91 and 92 are in an opened state, the top opening 90, in contact with the reading surface 37, may especially define an area between the slant surface 915 of the opening member 91 and the slant surface 925 of the opening member 92. In this case, the area defined by the top opening 90 corresponds to the symbol reading area 36.

Inside the head 22 of the data symbol reader 1, a tensile coil spring 25 is provided. One end of the coil spring 25 is hooked to a supporting member 913 provided on an inner periphery of the opening member 91, and the other end of the coil spring 25 is hooked to a supporting member 923 provided on an inner periphery of the opening member 92. The coil spring 25 serves as a dual position stability maintaining means, to maintain the primary position and the secondary position of the opening members 91 and 92 in stable states.

Figure 15:
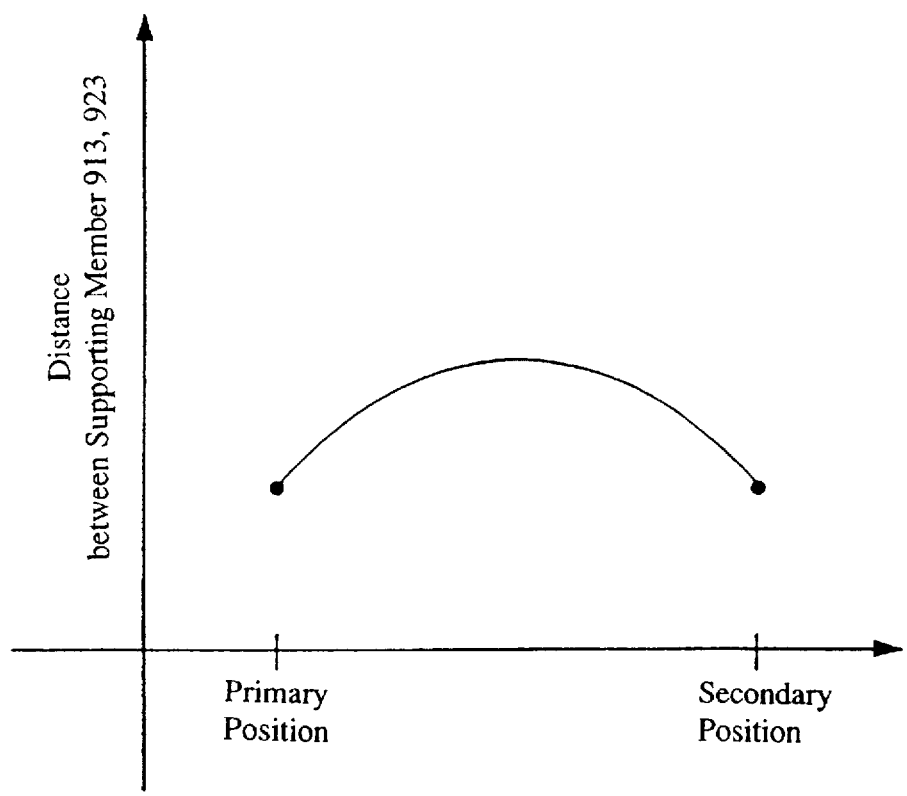
FIG. 15 is a graph showing a relationship between a distance between supporting members of a coil spring and positions of opening members, of the data symbol reader shown in FIG. 10.

FIG. 15 is a graphic chart illustrating the relation between the length of the coil spring 25, between the supporting members 913 and 923, and the position of the opening member 91 and 92.

As illustrated in FIG. 15, when the opening members 91 and 92 are closed (i.e., in the secondary position), and when the opening members 91 and 92 are opened (i.e., in the primary position), the coil spring 25 is in the most compressed state. Namely, in the primary and secondary positions, the distance between the supporting members 913 and 923 is at a minimum, while at intermediate positions, i.e., between the primary and the secondary positions, the distance between the supporting members 913 and 923 increases. Therefore, the opening members 91 and 92 are forced, by the coil spring 25, to be opened or to be closed, and consequently the opening members 91 and 92 are maintained in the closed state or in the opened state.

The supporting members 913 and 923 support both the ends of the coil spring 25, and the positions of the supporting members 913 and 923 vary in relation to the pins 23 and 24. As illustrated in FIG. 11, when the opening members 91 and 92 are closed, the supporting members 913 and 923 are positioned lower than the pins 23 and 24. In this state, through the coil spring 25, the opening member 91 is forced in the counterclockwise direction, and the opening member 92 is forced in the clockwise direction, and the opening members 91 and 92 are maintained to be in contact with each other. On the other hand, as illustrated in FIG. 13, when the opening members 91 and 92 are opened, the supporting members 913 and 923 are positioned above the pins 23 and 24 in FIG. 13. In the case of FIG. 13, through the coil spring 25, the opening member 91 is forced in the clockwise direction, and the opening member 92 is forced in the counterclockwise direction. Additionally, in such a state, the top end of the slit 911, as viewed in FIG. 13, is in contact with the projection 222, and the top end of the slit 921, as viewed in FIG. 13, is in contact with the projection 223.

With reference to FIG. 11, on the right of the front wall 221 of the head 22, a sensor switch 18a is provided. The sensor switch 18a is provided, in the form of a continuous-open type of limit switch, and when the operational chip is pressed, the switch 18a is turned ON. As illustrated in FIG. 11, when the opening members 91 and 92 are closed, the sensor switch 18a is turned ON through the opening member 92 pressing the operational chip. On the other hand, as illustrated in FIG. 13, when the opening members 91 and 92 are opened, the opening member 92 moves away from the operational chip, and consequently the sensor switch 18a is turned OFF. The sensor switch 18a serves as a sensor for detecting the positions of the opening members 91 and 92.

The state of the sensor switch 18a (i.e., ON or OFF) is output to the controller 15. When the sensor switch 18a is turned OFF, the first mode is set to read the bar code (i.e., the one-dimensional data symbol), namely, the one-dimensional data symbol reading mode. While, when the sensor switch 18a is turned ON, the second mode is set to read the two-dimensional data symbol, namely, the two-dimensional data symbol reading mode. The primary function of the mode setting means, which sets a mode from the first mode and the second mode, is operated through the controller 15.

In the above embodiment as shown in FIG. 10 through FIG. 15, when the bar code 35 is read, the opening members 91 and 92 are opened.

In this case, if one of the opening members 91 and 92, for example the opening member 91, is rotated clockwise against the force of the coil spring 25, through the engagement of the gear 911 with the gear 922, the other opening member 92 rotates counterclockwise (in FIG. 11). Such a rotation of the opening member 92 is in a direction opposite to the direction of the opening member 91, and the opening member 92 is rotated in synchronization with the opening member 91, by a similar angle as the opening member 91.

As illustrated in FIG. 13, when the opening members 91 and 92 rotate in the directions as above described, the projection 222 makes a relative upward movement with respect to the slit 911, and the projection 223 also makes a relative upward movement with respect to the slit 921. Consequently, the projections 222 and 223 are in contact with the upper ends of the slits 911 and 921, and the opening members 91 and 92 stop at the widest opening positions with respect to each other. At the positions described above, the opening members 91 and 92 are maintained in the primary position, namely the position at which the opening members 91 and 92 are opened, through the force of the coil spring 25. Further the operational chip of the sensor switch 18a moves away from the opening member 92, and the sensor switch 18a turned OFF, and the first mode is set through the controller 15.

As described above, when the opening members 91 and 92 are in the opened state, the top opening 90 in contact with the reading surface 37, may especially be an area defined between the slant surface 915 of the opening member 91 and the slant surface 925 of the opening member 92. In this case, the top opening 90 in such an area corresponds to the symbol reading area 36. Consequently, the symbol reading area 34 may be recognized accurately, and the positioning of the bar code 35 in relation to the symbol reading area 34 may be performed easily, promptly and accurately.

On the other hand, when the data symbol 38 is read, the opening members 91 and 92 are closed.

In this case, if one of the opening members 91 and 92, for example the opening member 91, is rotated counterclockwise (in FIG. 13) against the force of the coil spring 25, through the engagement of the gear 911 with the gear 922, the other opening member 92 rotates clockwise. Such a rotation of the opening member 92 is in a direction opposite to the direction of the opening member 91, and the opening member 92 is rotated in synchronization with the opening member 91, and by an identical angle as the opening member 91.

As illustrated in FIG. 11, when the opening members 91 and 92 rotate in the directions as described above, the projection 222 makes a relative downward movement with respect to the slit 911, and the projection 223 also makes a relative downward movement with respect to the slit 921. Consequently, the projections 222 and 223 are in contact with the lower ends of the slits 911 and 921, and the opening members 91 and 92 stop at the closed position. At that position, as described above, the opening members 91 and 92 are maintained in the secondary position, namely, the position at which the opening members 91 and 92 are closed, through the force of the coil spring 25. Further the operational chip of the sensor switch 18a is pressed by the opening member 92, and the sensor switch 18a is turned ON, and the second mode is set through the controller 15.

As described above, when the opening members 91 and 92 are in the closed state, the top opening 90 approximately corresponds to the symbol reading area 36. Consequently, the symbol reading area 36 may be recognized accurately, and the positioning of the data symbol 38 in relation to the symbol reading area 36 may be performed easily, promptly and accurately.

Figure 16:
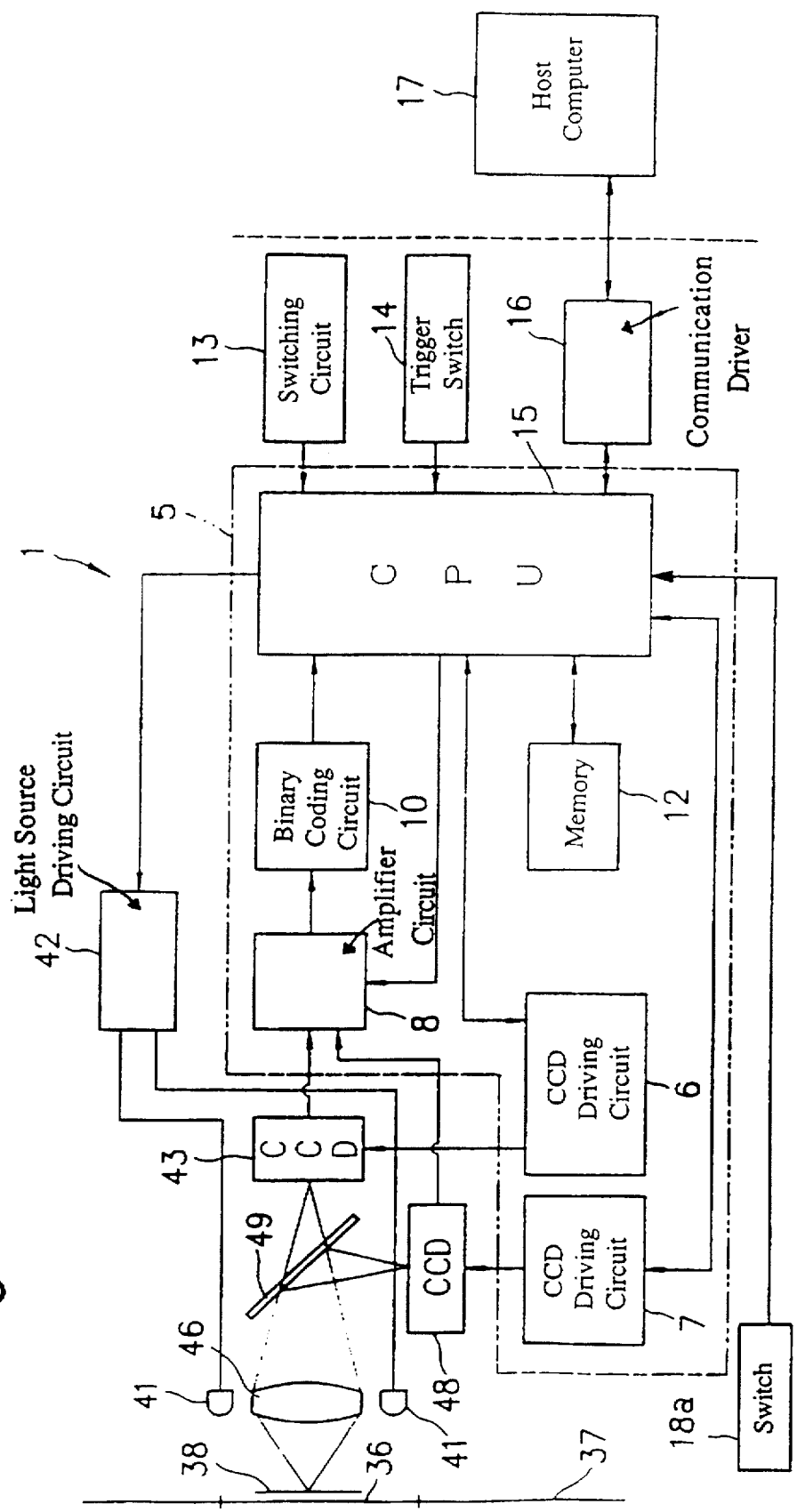
FIG. 16 is a schematic view of the data symbol reader shown in FIG. 10.
Figure 17:
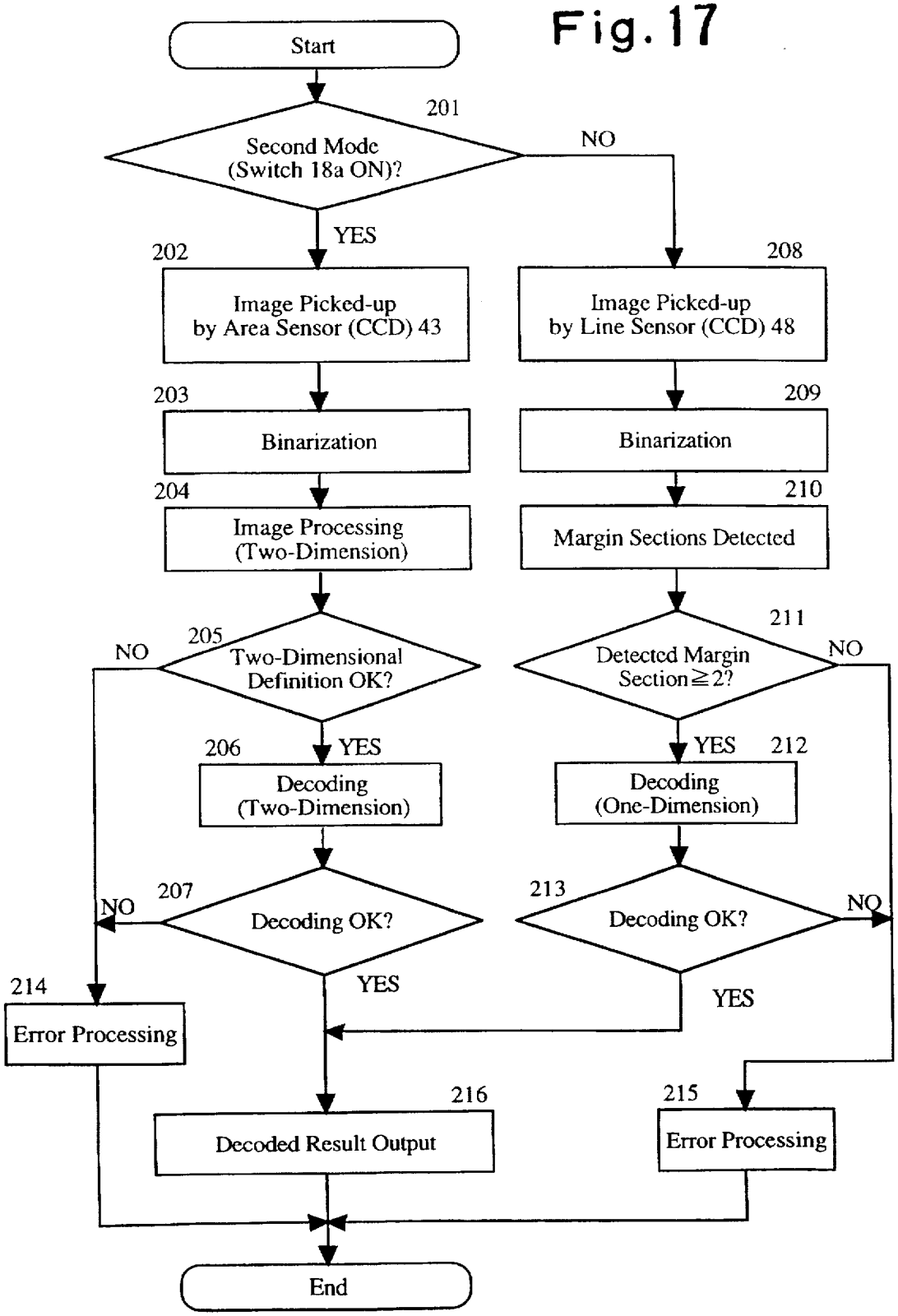
FIG. 17 is a flow chart showing an operation of a controlling means shown in FIG. 16.

FIG. 16 illustrates a block diagram of the present embodiment, and FIG. 17 is a block diagram of the operation thereof. FIG. 16 corresponds to FIG. 5, and FIG. 17 corresponds to FIG. 6. The only difference between FIGS. 16 and 17, and FIGS. 5 and 6, is that in FIGS. 16 and 17 the sensor switch 18a is provided, instead of the manual switch 18 shown in FIGS. 5 and 6. Therefore, no detailed explanation shall will be given.

As above described, in the present embodiment of the present invention, it is possible to vary the shape of the top opening 90 according to the respective symbol reading areas, i.e., the symbol reading area 36 or 34, according to a desired use, namely, if it is desired to read the data symbol 38 or the bar code 35. Consequently, when the bar code 35 or the data symbol 38 is read, the positioning of the bar code 35 or the data symbol 38, especially the positioning of the data symbol 38 in the symbol reading area 36, may be performed easily, promptly and accurately.

Further in the present embodiment, through the sensor switch 18a, the mode is set automatically corresponding to the subject to be read (i.e., the first mode or the second mode). Namely, when the opening members 91 and 92 are opened, the sensor switch 18a is turned OFF and the first mode is set, and when the opening members 91 and 92 are closed, the sensor switch 18a is turned ON and the second mode is set. With such an arrangement, compared with the data symbol reader of the first embodiment of the present invention, in which a switching means to switch between the first mode and the second mode is provided, the data symbol reader in the present embodiment has an easier operation, and is capable of a more appropriate and accurate reading.

The present invention is not limited to the embodiments described above, nor those illustrated in the drawings, and the invention can be modified without departing from the spirit and scope of the claimed invention.

For example, in the present embodiment, the coil spring 25 serves as a position stability maintaining means to maintain the positions of the opening members 91 and 92, but the position stability maintaining means in the present invention is not limited to the coil spring 25, and other forcing means, such as an elastic material, or a locking or click device, or the like, may be used.

As can be seen from the foregoing, according to the present invention, since the position of the data symbol can be visually confirmed at the first position, a quick positioning of the data symbol reader with respect to the data symbol to be read can be easily effected. Furthermore, no reading error occurs which would otherwise be caused when the data symbol is incorrectly positioned within the symbol reading area, thus resulting in a precise detection of the data symbol.

What is claimed is:

1. A data symbol reader for reading a one-dimensional data symbol and a two-dimensional data symbol, comprising:
   a first image pickup device having a light receiving surface to receive light reflected from said one-dimensional data symbol;
   a second image pickup device having a light receiving surface to receive light reflected from said two-dimensional data symbol;
   an optical system to respectively converge images of said one-dimensional data symbol onto said light receiving surface of said first image pickup device and of said two-dimensional data symbol onto said light receiving surface of said second image pickup device; and
   signal processing means for decoding said one-dimensional data symbol and said two-dimensional data symbol according to outputs of said first image pickup device and said second image pickup device wherein said optical system comprises:
      a first converging optical system to converge one of said image of said one-dimensional data symbol and said image of said two-dimensional data symbol onto said light receiving surface of said first image pickup device, and to set a magnification of said image converged onto said first image pickup image; and
      a second converging optical system to converge one of said image of said one-dimensional data symbol and said image of said two-dimensional data symbol onto said light receiving surface of said second image pickup device, and to set a magnification of said image converged onto said second image pickup device, a part of an optical path of said first converging optical system being commonly used as a part of an optical path of said second converging optical system.

2. A data symbol reader in accordance with claim 1, said optical system comprising an optical member that splits an optical path into a first optical path directed towards said first image pickup device and a second optical path directed towards said second image pickup device.

3. A data symbol reader in accordance with claim 1, wherein said first image pickup device comprises a line sensor, and said second image pickup device comprises an area sensor.

4. A data symbol reader in accordance with claim 1, further comprising mode setting means to select one of a first mode for reading said one-dimensional data symbol, and a second mode for reading said two-dimensional data symbol.

5. A data symbol reader for reading a one-dimensional data symbol and a two-dimensional data symbol, comprising:
   a first image pickup device having a light receiving surface to receive light reflected from said one-dimensional data symbol;
   a second image pickup device having a light receiving surface to receive light reflected from said two-dimensional data symbol;
   an optical system to respectively converge images of said one-dimensional data symbol onto said light receiving surface of said first image pickup device and of said two-dimensional data symbol onto said light receiving surface of said second image pickup device;
   signal processor that decodes said one-dimensional data symbol and said two-dimensional data symbol according to outputs of said first image pickup device and said second image pickup device;
   a detector that detects whether an imaged data symbol is said one-dimensional data symbol or said two-dimensional data symbol; and
   a switcher that switches a decoding operation performed by said signal processor in accordance with a detection made by said detector.

6. A data symbol reader, comprising:
   a casing having a head with an opening formed therein;
   an image pickup device having a light receiving surface, said image pickup device comprising:
      a first image pickup that reads a one-dimensional data symbol; and
      a second image pickup that reads a two-dimensional data symbol;
   an optical system which converges an image of a data symbol onto said image pickup device, said image of said data symbol being introduced through said opening of said casing; and
   an opening shape-varying mechanism that varies a shape of said opening of said casing.

7. A data symbol reader for reading a one-dimensional data symbol and a two-dimensional data symbol, comprising:
   a casing having a head with an opening formed therein;
   an image pickup device having a light receiving surface;
   an optical system which converges an image of said one-dimensional data symbol and an image of said two-dimensional data symbol onto said image pickup device, said images being introduced through said opening of said casing; and an opening shape-varying mechanism that varies a shape of said opening in accordance with a shape of said one-dimensional and two-dimensional data symbols, said image pickup device comprising:
- a first image pickup device for reading said one-dimensional data symbol; and
- a second image pickup device for reading said two-dimensional data symbol, wherein said optical system converges one of said image of said one-dimensional data symbol and said image of said two-dimensional data symbol onto light receiving surfaces of said first image pickup device and said second image pickup devices, wherein said opening shape-varying mechanism comprises a pair of opening members for forming said opening, and further comprising means for changing the position of said pair of opening members between a primary position for reading said one-dimensional data symbol, and a secondary position for reading said two-dimensional data symbol.

8. A data symbol reader in accordance with claim 7, wherein each member of said pair of opening members has a U-shaped cross section, free ends of each member of said pair of opening members being respectively pivoted to said casing so that an opening shape formed by said pair of opening members varies by a relative rotation of said members.

9. A data symbol reader in accordance with claim 7, further comprising motion transmitting means which transmits a motion of one member of said pair of opening members to another member of said pair of opening members, so that said pair of opening members move in a synchronous manner.

10. A data symbol reader in accordance with claim 9, wherein said motion transmitting means comprises a gear provided on each of said pair of opening members coaxial to a pivot thereof, each of said gears being engaged with an other of said gears so that said pair of opening members rotate in opposite directions to open and close said opening formed by said opening members.

11. A data symbol reader in accordance with claim 7, further comprising position maintaining means for maintaining said primary position and said secondary position of each of said pair of opening members.

12. A data symbol reader in accordance with claim 7, wherein a length of an optical path from said first image pickup device to said opening in said primary position and a length of an optical path from said second image pickup device to said opening in said secondary position are approximately equal each other.

13. A data symbol reader in accordance with claim 7, further comprising mode setting means for selecting one of a first mode for reading said one-dimensional data symbol and a second mode for reading said two-dimensional data symbol.

14. A data symbol reader in accordance with claim 7, further comprising:
- a sensor for detecting a position of said pair of opening members; and
- mode setting means for selecting one of a first mode for reading said one-dimensional data symbol and a second mode for reading said two-dimensional data symbol in accordance with a detected signal output from said sensor,
- wherein one of said one-dimensional and two-dimensional data symbol is read according to a mode set by said mode setting means.

* * * * *